(12) United States Patent
Kim et al.

(10) Patent No.: US 10,684,771 B2
(45) Date of Patent: Jun. 16, 2020

(54) USER DEVICE AND METHOD FOR CREATING HANDWRITING CONTENT

(71) Applicant: Samsung Electronics Co., Ltd., Suwon-si, Gyeonggi-do (KR)

(72) Inventors: Do-Hyeon Kim, Suwon-si (KR); Dong-Chang Lee, Suwon-si (KR); Dong-Hyuk Lee, Seoul (KR); Jae-Woong Lee, Bucheon-si (KR); Won-Suk Chang, Hwaseong-si (KR); Seong-Taek Hwang, Pyeongtaek-si (KR); Kang-Jin Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 450 days.

(21) Appl. No.: 14/468,810

(22) Filed: Aug. 26, 2014

(65) Prior Publication Data

US 2015/0058718 A1    Feb. 26, 2015

(30) Foreign Application Priority Data

Aug. 26, 2013  (KR) .................. 10-2013-0101099
Aug. 19, 2014  (KR) .................. 10-2014-0107560

(51) Int. Cl.
*G06F 3/0488*    (2013.01)
*G06F 3/01*    (2006.01)
(Continued)

(52) U.S. Cl.
CPC .......... *G06F 3/04883* (2013.01); *G06F 3/016* (2013.01); *G06F 3/03545* (2013.01);
(Continued)

(58) Field of Classification Search
CPC ...... G06F 17/276; G06F 17/2765; G06F 3/02; G06F 3/0233; G06F 3/04886;
(Continued)

(56) References Cited

U.S. PATENT DOCUMENTS 6,072,489 A * 6/2000 Gough .................. G06F 3/0481
                                                    715/803
6,501,855 B1 * 12/2002 Zelinski ............ G06F 17/30253
                                                    382/160

(Continued)

FOREIGN PATENT DOCUMENTS

CN          1802648 A     7/2006
CN        101689189 A     3/2010
(Continued)

OTHER PUBLICATIONS

Smart tag (Microsoft)—Wikipedia, XP055684867, Jul. 12, 2013.
(Continued)

*Primary Examiner* — Thu V Huynh
(74) *Attorney, Agent, or Firm* — Jefferson IP Law, LLP

(57) ABSTRACT

A method for creating handwriting content is provided. The method includes displaying handwriting letters being input, extracting at least one candidate handwriting word stored in advance in response to the input handwriting letters, displaying the extracted at least one candidate handwriting word, and replacing the input handwriting letters with a candidate handwriting word selected from among the displayed at least one candidate handwriting word.

14 Claims, 19 Drawing Sheets

(51) Int. Cl.
*G06K 9/22* (2006.01)
*G06K 9/00* (2006.01)
*G06F 3/0354* (2013.01)
*G06F 40/171* (2020.01)

(52) U.S. Cl.
CPC ....... *G06F 40/171* (2020.01); *G06K 9/00402* (2013.01); *G06K 9/222* (2013.01); *G06F 2200/1632* (2013.01)

(58) Field of Classification Search
CPC ...... G06F 3/018; G06F 3/04883; G06F 3/016; G06F 3/03545; G06F 17/242; G06F 17/2235; G06F 40/171; G06F 2200/1632; G06F 17/2755; G06K 9/00402; G06K 9/222
See application file for complete search history.

(56) References Cited

U.S. PATENT DOCUMENTS

| | | | | |
|---|---|---|---|---|
| 6,651,218 | B1* | 11/2003 | Adler | G06F 17/27 707/999.001 |
| 6,956,968 | B1* | 10/2005 | O'Dell | G06F 3/0237 382/182 |
| 6,978,421 | B1* | 12/2005 | Aida | G06F 3/018 715/236 |
| 7,546,524 | B1 | 6/2009 | Bryar et al. | |
| 8,843,845 | B2* | 9/2014 | Ouyang | G06F 3/04883 715/773 |
| 9,880,990 | B2* | 1/2018 | Zitnick, III | G06F 17/242 |
| 2001/0056439 | A1* | 12/2001 | Carro | G06F 3/04886 715/205 |
| 2002/0069223 | A1* | 6/2002 | Goodisman | G06F 16/9535 715/201 |
| 2002/0116528 | A1 | 8/2002 | Vale | |
| 2003/0104839 | A1* | 6/2003 | Kraft | G06F 3/0237 455/566 |
| 2003/0179201 | A1* | 9/2003 | Thacker | G06F 3/0481 345/441 |
| 2005/0089227 | A1 | 4/2005 | Haluptzok et al. | |
| 2005/0128181 | A1* | 6/2005 | Wang | G06K 9/00436 345/156 |
| 2005/0182794 | A1* | 8/2005 | Masui | G06F 17/276 |
| 2007/0005591 | A1 | 1/2007 | Lui et al. | |
| 2007/0047817 | A1* | 3/2007 | Abdulkader | G06K 9/6255 382/182 |
| 2007/0097095 | A1* | 5/2007 | Kim | G06F 1/1613 345/173 |
| 2007/0189613 | A1* | 8/2007 | Tanaka | G06K 9/80 382/229 |
| 2007/0266090 | A1 | 11/2007 | Len | |
| 2008/0077397 | A1* | 3/2008 | Shimohata | G06F 17/2735 704/10 |
| 2008/0195388 | A1* | 8/2008 | Bower | G06F 3/0237 704/243 |
| 2008/0195762 | A1* | 8/2008 | Wood | G06F 3/0237 710/1 |
| 2008/0310723 | A1* | 12/2008 | Manu | G06F 3/0237 382/182 |
| 2009/0226091 | A1 | 9/2009 | Goldsmith et al. | |
| 2009/0251338 | A1* | 10/2009 | Marggraff | G06K 9/228 341/20 |
| 2009/0284488 | A1* | 11/2009 | Sip | G06F 3/04883 345/173 |
| 2010/0245230 | A1 | 9/2010 | Yaun | |
| 2011/0320353 | A1* | 12/2011 | Mehew | G06Q 20/206 705/44 |
| 2013/0085743 | A1 | 4/2013 | Koo et al. | |
| 2013/0159919 | A1 | 6/2013 | Leydon | |
| 2013/0222238 | A1* | 8/2013 | Sliger | G06F 3/0484 345/157 |
| 2014/0028617 | A1* | 1/2014 | Kim | G06F 3/1454 345/174 |
| 2014/0164974 | A1* | 6/2014 | Kim | G06F 3/04883 715/773 |
| 2014/0282201 | A1* | 9/2014 | Pasquero | G06F 3/0237 715/773 |
| 2014/0317555 | A1* | 10/2014 | Choi | G06F 3/04817 715/781 |
| 2015/0007055 | A1* | 1/2015 | Lemus | G06F 3/0484 715/753 |
| 2015/0019961 | A1* | 1/2015 | Won | G06F 17/2211 715/268 |
| 2015/0035765 | A1* | 2/2015 | Hirabayashi | G06K 9/00436 345/173 |
| 2015/0043824 | A1* | 2/2015 | Akhavan Fomani | G06F 3/0237 382/188 |
| 2016/0103504 | A1* | 4/2016 | Kang | G06F 3/04883 345/173 |

FOREIGN PATENT DOCUMENTS

| | | |
|---|---|---|
| CN | 103034437 A | 4/2013 |
| EP | 2166488 A2 | 3/2010 |
| EP | 2575009 A1 | 4/2013 |
| KR | 10-1996-0042307 A | 12/1996 |
| KR | 10-2009-0023915 A | 3/2009 |
| WO | 2014/051134 A1 | 4/2014 |

OTHER PUBLICATIONS

Handwriting recognition, XP055685739, Jul. 24, 2013.
Wilcox et al., Dynomite: a dynamically organized ink and audio notebook, XP055685402, Jan. 1, 1997.
European Search Report dated Apr. 23, 2020, issued in European Patent Application No. 20153337.9.

* cited by examiner

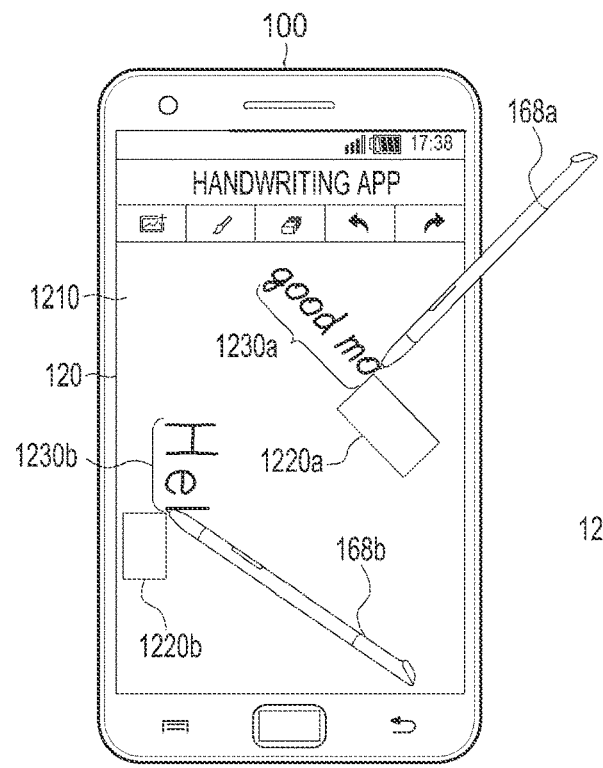
FIG.12A
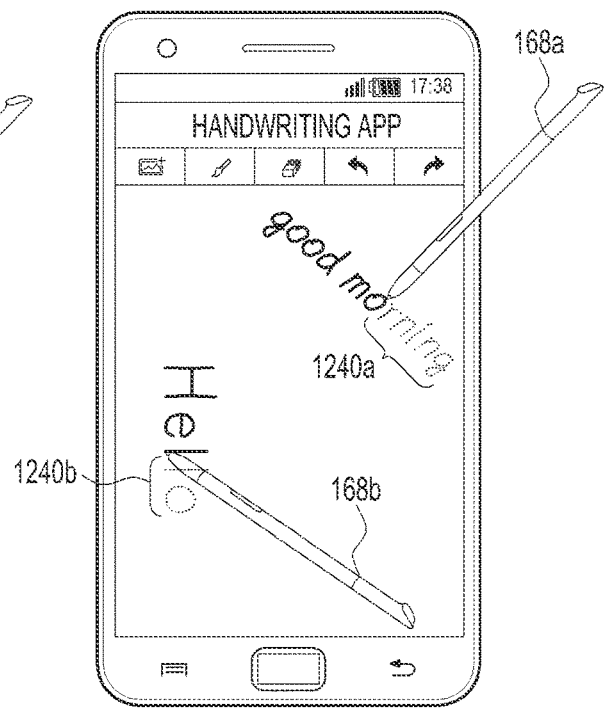
FIG.12B
FIG.12C
FIG.12D

USER DEVICE AND METHOD FOR CREATING HANDWRITING CONTENT

CROSS-REFERENCE TO RELATED APPLICATION(S)

This application claims the benefit under 35 U.S.C. § 119(a) of a Korean patent application filed in the Korean Intellectual Property Office on Aug. 26, 2013 and assigned Serial No. 10-2013-0101099, and of a Korean patent application filed in the Korean Intellectual Property Office on Aug. 19, 2014 and assigned Serial No. 10-2014-0107560, the entire disclosure of which is hereby incorporated by reference.

TECHNICAL FIELD

The present disclosure relates to a user device. More particularly, the present disclosure relates to a user device and method for creating or drawing up handwriting content.

BACKGROUND

In recent years, there has been a gradual increase in the number of various services and add-ons (or additional functions) provided by user devices. In order to increase the utility of the user devices and to meet various needs of users, a wide variety of applications executable in the user devices have been developed.

Accordingly, a few to hundreds of applications may be stored in user devices such as smart phones and tablet Personal Computers (PCs). Objects (or shortcut icons) provided for executing applications associated therewith are displayed on a screen of the user devices. The user devices may provide, to the displayed objects, at least one of a touch input scheme and a hovering input scheme, which are based on an input unit such as a user's finger, an electronic pen, a stylus pen, and/or the like. Using such input schemes, a user may input or enter handwriting content to the user's user device with handwriting applications installed therein. The handwriting applications may include a variety of document creation applications such as note applications, diary applications, and schedule applications, and/or the like.

When a user creates or draws up handwriting content or notes using such handwriting applications, there is a need for an input method for allowing the user to quickly input the handwriting content or notes with pre-created handwritten content, or for a method for allowing the user to quickly perform editing (e.g., a pen type change, a color change, a thickness change, and/or the like) on the pre-created content.

According to the related art, while the user creates handwriting content using an input unit, the user device may display a string being input or created by the user.

However, in the method of creating handwriting content according to the related art, the user may need to fully re-input the previously input or handwriting words, thereby inconveniencing the user, or typographical errors may occur when the user inputs words that have a large number of characters. Therefore, in creating handwriting content, there is a need to display the pre-created recommendable handwriting content and to allow the user to select a preferred one of the pre-created recommendable handwriting content, thereby enabling a user to quickly re-input the user's desired words or strings, and a need to quickly perform editing on the pre-created content, thereby providing convenience to the user.

In addition, there is a need to replace at least one word included in a string being input with at least one of an associated image, photo, and/or emoticon, thereby providing benefits to the user, and to change properties or attributes of the string being input, thereby making change to the handwriting content according to the user's preference possible.

Besides, there is a need to recommend the handwriting (or the style of penmanship) and the preferred words for each user, when multiple users enter their own handwriting content to one user device at the same time.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a user device and method for creating handwriting content.

In accordance with an aspect of the present disclosure, a method for creating handwriting content is provided. The method may include displaying handwriting letters being input, extracting at least one candidate handwriting word stored in advance in response to the input handwriting letters, displaying the extracted at least one candidate handwriting word, and replacing the input handwriting letters with a candidate handwriting word selected from among the displayed at least one candidate handwriting word.

In accordance with an aspect of the present disclosure, the at least one candidate handwriting word may be a word that is the same as, or similar to a word including the input handwriting letters.

In accordance with an aspect of the present disclosure, the displaying of the extracted at least one candidate handwriting word may include displaying a word corresponding to the input handwriting letters in a shaded way.

In accordance with an aspect of the present disclosure, the displayed string may be stored in units of at least one of handwriting letters, handwriting keywords and handwriting phrases.

In accordance with an aspect of the present disclosure, the at least one candidate handwriting word may be applied and displayed in response to the input handwriting letters, in real time.

In accordance with an aspect of the present disclosure, the at least one candidate handwriting word may be displayed after priority thereof is determined using at least one of storage order, input frequency, and relationship with an adjacent keyword.

In accordance with another aspect of the present disclosure, a method for creating handwriting content is provided. The method may include displaying a handwriting string being input, analyzing a keyword included in the input handwriting string, extracting an image corresponding to the keyword, and replacing the keyword with the extracted image, and displaying the replacement results including the extracted image.

In accordance with an aspect of the present disclosure, the extracting of the image corresponding to the keyword may include converting the keyword into a code, and extracting an image that is matched to the converted code in advance.

In accordance with an aspect of the present disclosure, the displaying of the replacement results may include replacing the keyword with an associated extracted image in response to an input of the keyword, and displaying the replacement results, or after the input of the string is completed, extracting at least one image corresponding to at least one keyword included in the completely input handwriting string, replacing the keyword with the extracted image, and displaying the replacement results.

In accordance with an aspect of the present disclosure, if the analyzed keyword is selected in response to the analysis of the keyword, properties of the keyword may be changed so that a function corresponding to the analyzed keyword may be executed.

In accordance with an aspect of the present disclosure, the function may include at least one of an email function, a file access or execution function, an Internet access function, and a call function.

In accordance with further another aspect of the present disclosure, a method for creating handwriting content is provided. The method may include displaying a handwriting string being input, receiving settings for changing properties of the displayed handwriting string, and changing properties of at least one keyword selected from the displayed handwriting string into properties corresponding to the received settings.

In accordance with an aspect of the present disclosure, the method may further include displaying a string including at least one keyword that has properties that are changed in response to the received settings.

In accordance with an aspect of the present disclosure, the settings may include at least one of a pen-type setting, a thickness setting, and a color setting to be applied to the selected at least one keyword.

In accordance with an aspect of the present disclosure, the at least one keyword may be selected based on at least one of trajectory of an input unit and an area defined by the trajectory of the input unit, in the displayed string.

In accordance with an aspect of the present disclosure, the method may further include displaying trajectory in response to the settings, if the trajectory is input to select the at least one keyword.

In accordance with yet another aspect of the present disclosure, a user device for creating handwriting content is provided. The user device may include a screen configured to display a handwriting string being input, and a controller to extract at least one candidate handwriting word stored in advance in response to handwriting letters included in the input handwriting string, and to replace the handwriting letters with a candidate word selected from among the extracted at least one candidate handwriting word.

In accordance with an aspect of the present disclosure, the user device may further include a storage unit configured to store the handwriting string being input in units of at least one of handwriting letters, handwriting keywords and handwriting phrases.

In accordance with an aspect of the present disclosure, the controller may display at least one candidate handwriting word corresponding to the input letters on the screen in real time.

In accordance with an aspect of the present disclosure, the controller may determine priority of the extracted at least one candidate handwriting word using at least one of storage order, input frequency, and relationship with an adjacent keyword, and displays the at least one candidate handwriting word on the screen using the determined priority.

In accordance with an aspect of the present disclosure, the controller may extract an image corresponding to a keyword included in the handwriting string, replace the keyword with the extracted image, and display the replacement results on the screen.

In accordance with an aspect of the present disclosure, the controller may replace the keyword included in the string with an associated extracted image in response to an input of the keyword, and displays the replacement results on the screen. Otherwise, after the input of the string is completed, the controller may extract at least one image corresponding to at least one keyword included in the completely input string, replace the keyword with the extracted image, and display the replacement results including extracted image on the screen.

In accordance with an aspect of the present disclosure, if settings for changing properties of the displayed string are received, the controller may change properties of at least one keyword selected from the displayed string into properties corresponding to the received settings.

In accordance with an aspect of the present disclosure, the controller may convert at least one keyword included in the string being input into a text, correct a typographical error of the at least one keyword using the text, and display the correction results on the screen.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 12A illustrates an example of displaying at least one candidate word corresponding to letters being input by multiple users according to an embodiment of the present disclosure;

FIG. 12B illustrates an example of displaying keywords corresponding to letters being input by multiple users in a shaded way according to an embodiment of the present disclosure;

FIG. 12C illustrates at least one candidate word corresponding to letters being input by a first user among multiple users according to an embodiment of the present disclosure;

FIG. 12D illustrates at least one candidate word corresponding to letters being input by a second user among multiple users according to an embodiment of the present disclosure;

Throughout the drawings, like reference numerals will be understood to refer to like parts, components, and structures.

DETAILED DESCRIPTION

Figure 1:
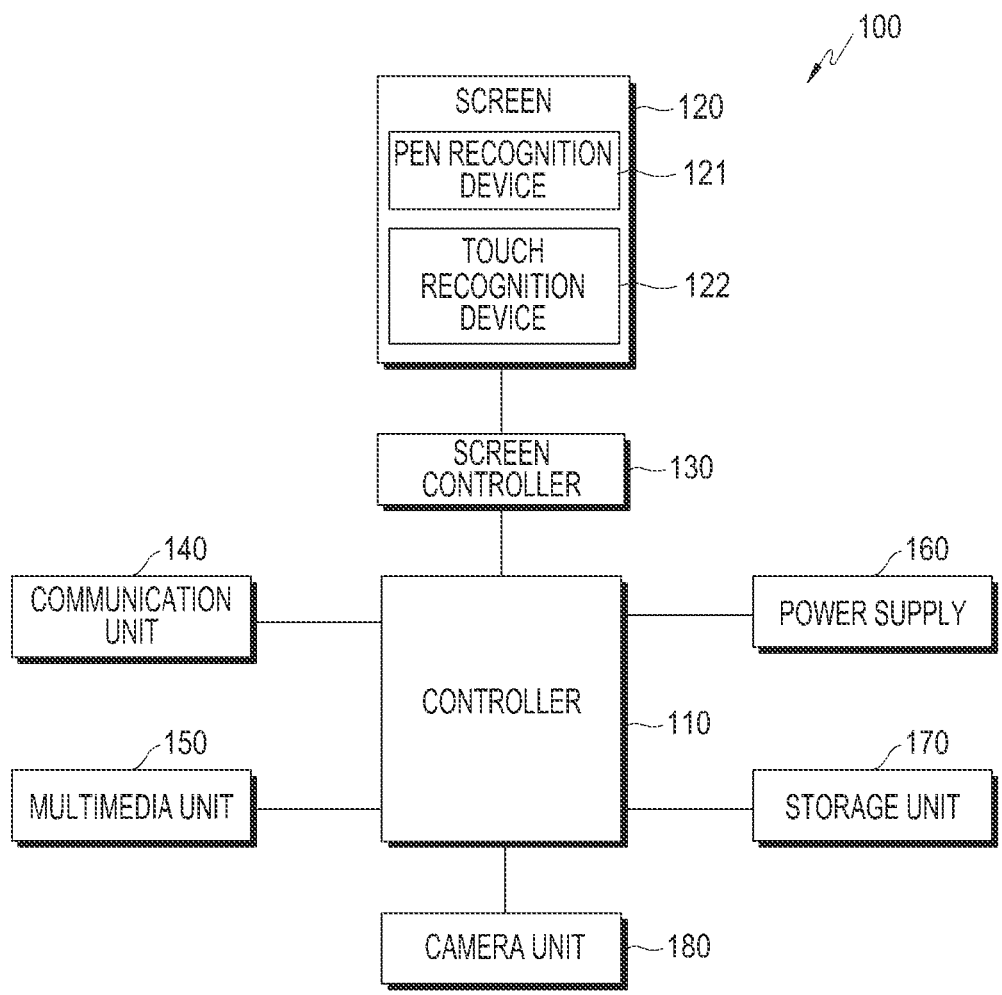
FIG. 1 illustrates a user device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

First, the terms used in the present disclosure will be defined as follows.

User Device: A user device refers to a mobile terminal capable of data transmission/reception and voice/video calls, and may be equipped with at least one digitizer. A user device may include smart phone, tablet Personal Computer (PC), 3D-TV, smart TV, Light Emitting Diode (LED) TV, Liquid Crystal Display (LCD) TV, an e-book reader, a desktop PC, a laptop PC, a netbook PC, an electronic blackboard, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), a gaming console, an electronic dictionary, an electronic key, a camcorder, an electronic picture frame, a navigation device, a Global Positioning System (GPS) receiver, and the like, and may also include any device capable of communicating with peripherals or other terminals located in remote areas. The user device may receive inputs from multiple users at the same time. According to various embodiments of the present disclosure, a user device may be any combination of the foregoing devices. In addition, it will be apparent to one having ordinary skill in the art that a user device according to various embodiments of the present disclosure is not limited to the foregoing devices.

Input Unit: An input unit may include at least one of a finger, an electronic pen, a digital-type pen, a pen without an Integrated Circuit (IC), a pen with an IC, a pen with an IC and memory, a pen capable of local communication, a pen with an additional ultrasonic detector, a pen with an optical sensor, a joystick, a stylus pen, and the like, all of which can provide commands or inputs to a user device if a touch is made on a digitizer of the user device not only in a contact event, but also in a non-contact event (e.g., hovering event).

Handwriting Application: A handwriting application may include a variety of document creation applications, such as a note application, a diary application, a schedule application, a word application, and/or the like, which can receive at least one of letters, words, and/or strings being input with at least one of an input unit and a finger, and can display the input information on a screen.

Keyword: A keyword may include at least one of words, syllables, special characters, email addresses, Uniform Resource Locator (URL) addresses, and the like which are input on a screen using an input unit or a finger, and paths to files or applications stored or installed in a user device, and may also include at least one of letters, phrases, characters, alphabets, symbols, and the like.

FIG. 1 illustrates a user device according to various embodiments of the present disclosure.

Referring to FIG. 1, a user device 100 includes a controller 110, at least one screen 120, at least one screen controller 130, a communication unit 140, a multimedia unit 150, a power supply unit 160, a storage unit 170, and a camera unit 180.

The user device 100 may be connected to external devices (not shown) using at least one of a communication unit 140, a connector (not shown) and an earphone jack (not shown). The external devices may correspond to a wide variety of devices, such as earphones, external speakers, Universal Serial Bus (USB) memories, chargers, a cradle/dock, Digital Multimedia Broadcasting (DMB) antennas, mobile payment-related devices, healthcare devices (e.g., blood glucose meters and the like), game consoles, car navigation devices, and/or the like, all of which are detachable from the user device 100, and which can be connected to the user device 100 by wires. The external devices may also include Bluetooth devices, Near Field Communication (NFC) devices, Wi-Fi Direct devices, wireless Access Points (APs), and the like, which can be wirelessly connected to the user device 100. The user device 100 may be connected to other devices (e.g., portable terminals, smart phones, tablet PCs, desktop PCs, digitizers, input devices, cameras, servers, and the like) by wires or wirelessly.

The user device 100 may include the at least one screen 120 that provides a user with user interfaces corresponding to various services (e.g., call, data transfer, broadcasting, photo capturing, string input, and/or the like). Each of the at least one screen 120 may include a pen recognition device 121 and a touch recognition device 122. The pen recognition device 121 may configured to recognize an input that is made using at least one of an input unit and a finger. The touch recognition device 122 may be configured to recognize a touch that is made by at least one of the finger and the input unit. The pen recognition device 121 and the touch recognition device 122 may be respectively called a pen recognition panel and a touch recognition panel. Each of the at least one screen 120 may transfer an analog signal corresponding to at least one touch input to a user interface, to an associated screen controller 130. Consequently, the user device 100 may include a plurality of screens 120, and may also include a plurality of screen controllers 130 for receiving analog signals corresponding to touch inputs to the associated screens. The screens 120 may be coupled to a plurality of housings by being hinged, respectively, or may be mounted on one housing without being hinged. According to various embodiments of the present disclosure, the user device 100 may include at least one screen 120 as described above, and for convenience of description, the user device 100 will be assumed to have one screen 120.

A controller 110 may include a Central Processing Unit (CPU), a Read Only Memory (ROM) storing a control program for control of the user device 100, and a Random Access Memory (RAM) that is used to temporarily store signals or data received from the outside of the user device 100, or is used as a workspace for operations performed in the user device 100. According to various embodiments of the present disclosure, the CPU may include various number of cores. For example, the CPU may include a single-core CPU, a dual-core CPU, a triple-core CPU, a quad-core CPU, or the like.

The controller 110 may control the screen 120, the pen recognition device 121, the touch recognition device 122, the screen controller 130, the communication unit 140, the multimedia unit 150, the power supply 160, the storage unit 170, and the camera unit 180.

While various objects or strings being input are displayed on the screen 120, the controller 110 may determine whether hovering is recognized as an input unit approaches any one object, and may identify an object corresponding to the position at which the hovering has occurred. The controller 110 may detect a height from the screen 120 of the user device 100 to the input unit, and a hovering input event determined based on the height. The hovering input event may include at least one of an event according to which a button formed on the input unit is pressed, an event according to which the input unit is tapped, an event according to which the input unit moves faster than a predetermined speed, and an event according to which an object is touched.

The controller 110 may display handwriting letters being input on the screen 120, extract at least one candidate word stored in advance in response to the input letters (or the letters being input), display the extracted at least one candidate word in real time, and replace the input handwriting letters with a candidate word selected from the displayed at least one candidate word. The controller 110 may determine each user by analyzing the handwriting of each user, which is being input to the screen 120. The controller 110 may determine each user based on at least one of iris recognition or face recognition by a camera, fingerprint recognition by a fingerprint sensor included in a pen, information about a pen ID assigned to each user, an ID of a user that has presently logged in the system, and a user ID transmitted by a device (e.g., a smart phone or a wearable device) by which the user inputs the handwriting. The controller 110 may display letters that are input on the screen 120 by multiple users, extract at least one candidate word stored in advance in response to the input letters by each user, and display the extracted at least one candidate word in real time. The controller 110 may recognize the handwriting of each of the multiple users, letters in the recognized handwriting being input on the screen 120, read a recommended word corresponding to the input letters among the candidate words stored in advance from the storage unit 170 for each user, and display the read recommended word on the screen 120. According to various embodiments of the present disclosure, the at least one candidate word may include the input handwriting letters. According to various embodiments of the present disclosure, the at least one candidate word may be a word that is the same as, or similar to a word including the handwriting letters being input. The controller 110 may display a word corresponding to the input letters in a shaded way, and may display a string including the replacing candidate word on the screen 120. The controller 110 may store a string that is input to or displayed on the screen 120, in the storage unit 170 in units of letters, words, or strings. The controller 110 may determine at least one candidate word using at least one of storage order, input frequency, and relationship with an adjacent word among a plurality of letters, words, keywords, phrases, strings, and the like stored in advance in the storage unit 170, and display the determined at least one candidate word on the screen 120. The controller 110 may convert at least one of letters, words, and string being input into a code, and extract at least one candidate word using the code.

The controller 110 may display a string being input on the screen 120, analyze a keyword (or a word) included in the string being input, extract an image corresponding to the keyword, and replace the keyword being input with the extracted image. The controller 110 may convert the keyword being input into a code, and extract an image that is matched to the code in advance. The controller 110 may replace the keyword with an associated extracted image in response to an input of the keyword, and may display the replacement results. Otherwise, after the input of the string is completed, the controller 110 may extract at least one image corresponding to at least one keyword included in the completely input string, may replace the keyword with the extracted image, and may display the extracted image on the screen 120. The controller 110 may display a string in which the keyword is replaced with the extracted image. In the case in which the analyzed keyword corresponds to an email address, if the email address is selected, the controller 110 may change the properties of the keyword so that an email application may be executed. In the case in which the analyzed keyword corresponds to a phone number, if the phone number is selected, the controller 110 may change the properties of the keyword so that a phone call (or a Call application) may be executed. In the case in which the analyzed keyword corresponds to a URL, if the URL is selected, the controller 110 may change the properties of the keyword so that an Internet access application or program used to access a URL may be executed. In the case in which the analyzed keyword corresponds to an access path to any file or application stored or installed in the user device 100, if the keyword is selected, the controller 110 may change the properties of the keyword so that the user device 100 may access or execute the file or application.

After displaying a string being input on the screen 120, if settings for changing properties of the displayed string are received, the controller 110 may change the properties of at least one keyword (or a word) selected from the displayed string into the properties corresponding to the received settings, and may display the resulting properties on the screen 120. The controller 110 may display a string including at least one keyword having properties that are changed in response to the received settings. The settings may include at least one of pen-type, a thickness, and color settings to be applied to the selected at least one keyword. The at least one keyword may be selected based on at least one of trajectory of an input unit and an area defined by the trajectory of the input unit, in the displayed string. If trajectory is input to select at least one keyword, the controller 110 may display the trajectory in response to the settings.

The controller 110 may convert at least one keyword (or a word) included in the string being input to the screen 120 into a text, correct typographical errors of the at least one keyword using the text, and display the corrected text on the display 120.

The screen 120 may receive at least one touch that is made by the user's body (e.g., a finger including the thumb, and/or the like) or the touch input unit (e.g., a stylus pen, an electronic pen, and/or the like). The screen 120 may recognize the handwritings which are input simultaneously by multiple users, and display the handwriting which is input by each user. The screen 120 may include the pen recognition device 121 for recognizing a pen input made by a pen such as the stylus pen and the electronic pen, and the touch recognition device 122 for recognizing a touch input made by the user's body. The pen recognition device 121 may determine a distance between the pen and the screen 120 based on the magnetic field, supersonic waves, optical information, surface acoustic waves, and/or the like, and the touch recognition device 122 may detect a touched position depending on the charges that are moved by the touch. The touch recognition device 122 may detect any kind of touch that can cause static electricity, and may also detect a touch made by the finger, the pen, or the like, which is an input unit. The screen 120 may receive a continuous movement of one touch made to input a string, among at least one touch. The screen 120 may transfer an analog signal corresponding to the continuous movement of the touch made to input a string, to the screen controller 130.

According to various embodiments of the present disclosure, the touch may be construed to include not only the contact touch between the screen 120 and the user's body or the touch input unit, but also the non-contact touch (e.g., a hovering event) between the screen 120 and the user's body or the touch input unit, a detectable gap between the screen 120 and the user's body or the touch in put unit being set to a predetermined value. The detectable gap between the screen 120 and the user's body or the touch input unit is subject to change depending on the performance or structure of the user device 100. For example, the screen 120 may be configured to separately detect a contact touch event and a non-contact touch event (e.g., a hovering event) between the screen 120 and the user's body or the touch input unit, and output different values (e.g., including, analog voltage values, current values, and/or the like) detected by the contact touch event and the non-contact touch event (e.g., the hovering event). The screen 120 may differently output the detected values (e.g., current values, and/or the like) depending on the distance between the screen 120 and the space at which a hovering event occurs.

The pen recognition device 121 and/or the touch recognition device 122 may be implemented in, for example, a resistive manner, a capacitive manner, an infrared manner, an acoustic wave manner, and/or the like.

The screen 120 may include at least two touch screen panels capable of detecting a touch or an approach of the user's body and the touch input unit, respectively, to sequentially or simultaneously receive inputs made by the user's body and the touch input unit. The at least two touch screen panels may provide different output values to the screen controller 130, and the screen controller 130 may differently recognize the values received from the at least two touch screen panels, and determine whether the input from the screen 120 is an input by the user's body, or an input by the touch input unit. The screen 120 may display at least one object or a string being input.

More specifically, the screen 120 may be formed in a structure in which a touch panel for detecting an input by the finger or the input unit based on a change in induction electromotive force, and a touch panel for detecting an input by the finger or the input unit based on the touch between the screen 120 and the finger or the input unit may be stacked in sequence to be in contact with each other, or to be partially separated from each other. The screen 120 may include a plurality of pixels, and may display an image using the pixels, or display handwriting content being input by the input unit or the finger. The screen 120 may use, as a panel thereof, LCD, Organic Light Emitting Diodes (OLED), LED), and the like.

The screen 120 may include a plurality of sensors that detect the position at which the finger or the input unit is in contact with the surface of the screen 120, or is put over the screen 120 with a predetermined gap. Each of the plurality of sensors may be formed in a coil structure, and a sensor layer formed of the plurality of sensors may have patterns in which the sensors are set in advance. A plurality of electrode lines may be formed on the sensor layer. In this structure, if a contact or hovering input occurs on the screen 120 through the finger or the input unit, a detection signal that has waveforms that are changed due to the change in capacitance between the sensor layer and the input unit may be generated in the touch recognition device 122, and the screen 120 may transfer the generated detection signal to the controller 110. The predetermined gap between the input unit and the pen recognition device 121 may be determined depending on the strength of the magnetic field formed by the coil.

The screen controller 130 may convert a received analog signal into a digital signal (e.g., X and Y coordinates) based on a string being input on the screen 120, and transfer the digital signal to the controller 110. The controller 110 may control the screen 120 using the digital signal received from the screen controller 130. For example, in response to a touch event or a hovering event, the controller 110 may select or execute a shortcut icon (not shown) or an object displayed on the screen 120. The screen controller 130 may be incorporated into the controller 110.

The screen controller 130 may determine the distance between the screen 120 and the space at which an hovering event occurs, by detecting the values (e.g., current values, and the like) output from the screen 120, and may convert the determined distance value into a digital signal (e.g., Z coordinates) and provide the digital signal to the controller 110.

The communication unit 140 may include a mobile communication unit (not shown), a sub-communication unit (not shown), a wireless Local Area Network (LAN) unit (not shown), and a short-distance communication unit (not shown) depending on the communication scheme, the transmission distance, and the type of data to be transmitted and received. The mobile communication unit, under control of the controller 110, may connect the user device 100 to an external device through mobile communication using at least one or multiple antennas (not shown). The mobile communication unit may exchange wireless signals for voice calls, video calls, Short Message Service (SMS) messages or Multimedia Messaging Service (MMS) messages, with a cell phone (not shown), a smart phone (not shown), a tablet PC (not shown) or other devices (not shown), phone numbers of all of which are input in the user device 100. The sub-communication unit may include at least one of a wireless LAN unit (not shown) and a short-distance communication unit (not shown). For example, the sub-communication unit may include any one or both of the wireless LAN unit and the short-range communication unit. The sub-communication unit may exchange control signals with the input unit. Control signals exchanged between the user device 100 and the input unit may include at least one of a field for supplying power to the input unit, a field for detecting a touch or hover input between the input unit and the screen 120, a field for detecting a situation in which a button mounted on the input unit is pressed or input, a field indicating an identifier of the input unit, a field indicating X and Y coordinates at which the input unit is located, and the like. The input unit may transmit a feedback signal for the control signal received from the user device 100, to the user device 100. The wireless LAN unit, under control of the controller 110, may be connected to the Internet in the place at which a wireless Access Point (AP) (not shown) is installed. The wireless LAN unit may support the WLAN standard IEEE802.11x proposed by Institute of Electrical and Electronics Engineers (IEEE). The short-range communication unit, under control of the controller 110, may enable wireless short-range communication between the user device 100 and an image forming device (not shown). The short-range communication scheme may include Bluetooth, Infrared Data Association (IrDA), Wi-Fi Direct, NFC, and/or the like.

Using at least one of the sub-communication unit and the wireless LAN unit, the controller 110 may communicate with an adjacent communication device or a communication device located in a remote area, receive a variety of data such as images, emoticons, photos, and/or the like over the Internet, and communicate with the input unit. The communication between the controller 110 and the communication device and/or the input unit may be performed by exchange of control signals.

The user device 100 may include at least one of the mobile communication unit, the wireless LAN unit, and the short-range communication unit depending on a configuration of the user device 100. The user device 100 may include a combination of the mobile communication unit, the wireless LAN unit, and the short-range communication unit depending on a configuration of the user device 100. According to various embodiments of the present disclosure, at least one of the mobile communication unit, the wireless LAN unit, the screen, and the short-range communication unit, or a combination thereof will be referred to as a transceiver unit. However, such reference is not intended to limit the scope of the present disclosure.

The multimedia unit 150 may include a broadcasting & communication unit (not shown), an audio playback unit (not shown), and/or a video playback unit (not shown). The broadcasting & communication unit, under control of the controller 110, may receive broadcast signals (e.g., TV broadcast signals, radio broadcast signals, data broadcast signals, and/or the like) and additional broadcast information (e.g., Electronic Program Guide (EPG), Electronic Service Guide (ESG), and/or the like), which are transmitted from broadcasting stations via a broadcasting & communication antenna (not shown). The audio playback unit, under control of the controller 110, may play stored or received digital audio files (e.g., with a file extension of mp3, wma, ogg, wav, and/or the like). The video playback unit, under control of the controller 110, may play stored or received digital video files (e.g., with a file extension of mpeg, mpg, mp4, avi, mov, mkv, and/or the like). The video playback unit may play digital audio files as well.

The power supply 160, under control of the controller 110, may supply power to one or multiple batteries (not shown) mounted in the housing of the user device 100. One or multiple batteries (not shown) may supply power to the user device 100. The power supply 160 may supply, to the user device 100, the power that is received from the external power source (not shown) via a wired cable connected to a connector (not shown). The power supply 160 may supply, to the user device 100, the power that is wirelessly received from the external power source using wireless charging technology.

The storage unit 170, under control of the controller 110, may store the signals or data which are input/output in response to operations of the communication unit 140, the multimedia unit 150, the screen 120 and the camera unit 180.

The storage unit 170 may store a control program for control of the user device 100 or the controller 110, and a variety of applications.

The storage unit 170 may include a non-volatile memory, a volatile memory, a Hard Disk Drive (HDD), a Solid State Drive (SSD), and/or the like.

The storage unit 170 may store at least one of letters, words, strings, and the like being input to the screen 120, and may store a variety of data that the user receives over the Internet, such as texts, images, emoticons, icons, and/or the like. The storage unit 170 may store at least one of letters, words and strings including at least one of the handwriting and preferred words for each of multiple users. The storage unit 170 may store applications of a variety of functions, such as a navigation application, a video call application, a gaming application, a time-based user alarm application, and/or the like, images used to provide Graphical User Interfaces (GUIs) related to such applications, databases or data related to user information, documents and methods for processing touch inputs, background images (e.g., menu screens, standby screens, and/or the like) or applications needed to drive the user device 100, and images captured by the camera unit 180. The storage unit 170 is a non-transitory machine-readable (e.g., computer-readable) medium, and the term 'machine-readable medium' may be defined as a medium that provides a machine so that the machine may execute a specific function. The machine-readable medium may be storage media. The storage unit 170 may include non-volatile media and volatile media. For all of these media, commands carried by the media should be a type of commands that can be detected by a physical mechanism that reads the commands by the machine.

The camera unit 180 may include at least one camera. According to various embodiments of the present disclosure, the camera unit 180 of the user device 100 may include at least one of a barrel unit (not shown) for zoom-in/out of at least one camera, a motor unit (not shown) for controlling movement of the barrel unit, for controlling zoom-in/out of the barrel unit, a flash (not shown) for providing a light source for image/video capturing, and the like.

Figure 2:
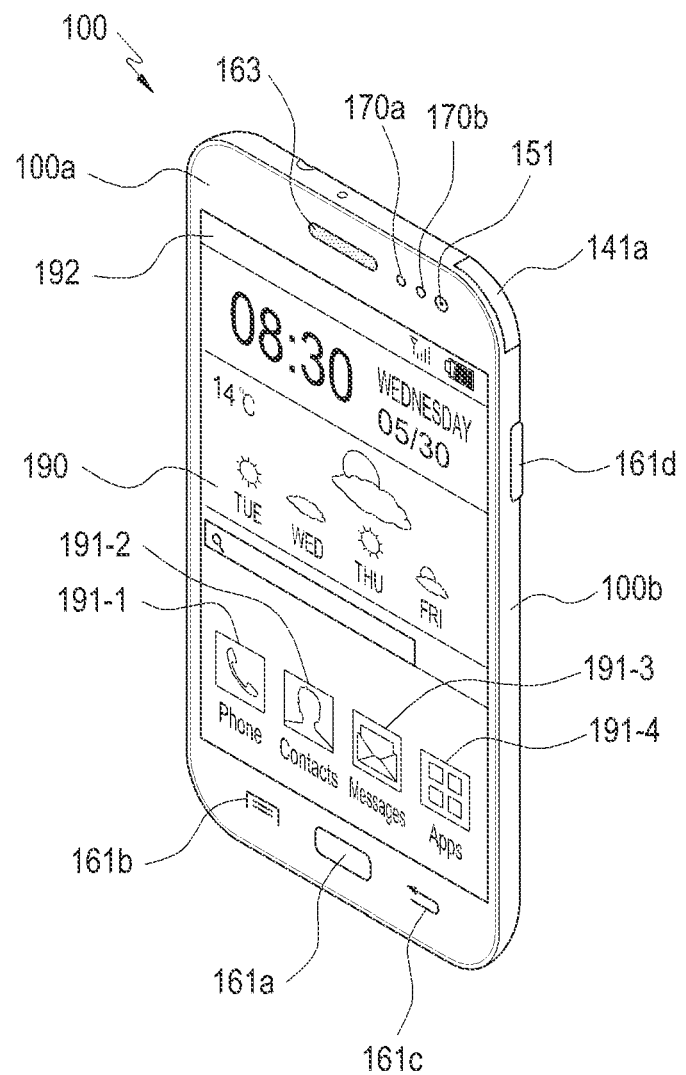
FIG. 2 is a front perspective view of a user device according to various embodiments of the present disclosure.
Figure 3:
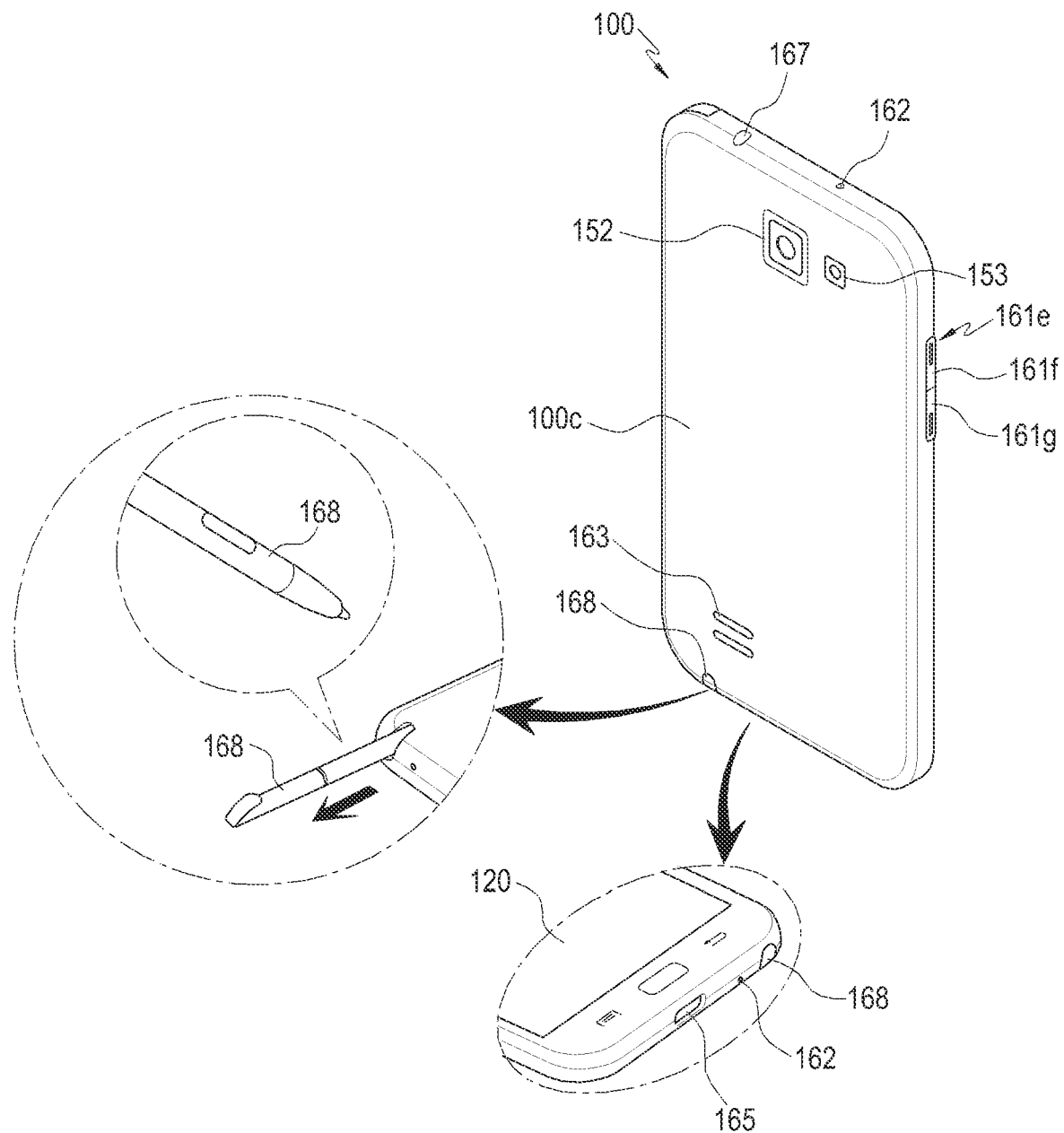
FIG. 3 is a rear perspective view of a user device according to various embodiments of the present disclosure.

FIG. 2 is a front perspective view of a user device according to various embodiments of the present disclosure. FIG. 3 is a rear perspective view of a user device according to various embodiments of the present disclosure.

Referring to FIGS. 2 and 3, the screen 120 may be disposed in the center of the front 100a of the user device 100. The screen 120 may be formed large enough to occupy most of the front 100a of the user device 100. FIG. 2 illustrates an example of a main home screen 190 displayed on the screen 120. The main home screen 190 may be the first screen that is displayed on the screen 120 when the user device 100 is powered on and/or activated. If the user device 100 has different home screens of multiple pages, the main home screen 190 may be the first home screen among the home screens of multiple pages. Short icons 191-1 (e.g., to activate a phone-calling function), 191-2 (e.g., to activate a contacts function), and 191-3 (e.g., to activate a message composition/viewing function) used to execute frequently used applications, a main menu switch key 191-4, time, weather, and/or the like may be displayed on the main home screen 190. The main menu switch key 191-4 may be used to display a menu screen on the screen 120. A status bar 192 indicating the status of the user device 100, such as battery level, received signal strength, current time, and/or the like may be displayed on the top of the screen 120.

Under the screen 120 may be formed a home button 161a, a menu button 161b, and a back button 161c.

The home button 161a may be used to display the main home screen 190 on the screen 120. For example, if the home button 161a is touched while any home screen different from the main home screen 190, or a menu screen is displayed on the screen 120, the main home screen 190 may be displayed on the screen 120. If the home button 161a is touched while applications are executed on the screen 120, the main home screen 190 shown in FIG. 2 may be displayed on the screen 120. The home button 161a may also be used to display recently used applications on the screen 120, or to display a task manager.

The menu button 161b provides connection menus that can be used on the screen 120. For example, the connection menus may include an add widget menu, a change wallpaper menu, a search menu, an edit menu, a preference menu, and/or the like.

The back button 161c may be used to display the previously run screen preceding the currently running screen, or to exit the last used application.

On the edge of the front 100a of the user device 100 may be disposed a first camera 151, a speaker 163, an ambient light sensor 170a, and/or a proximity sensor 170b. On the rear 100c of the user device 100 may be disposed a second camera 152, a flash 153, and a speaker 163.

On the sides 100b of the user device 100 may be disposed, for example, a power/reset button 161d, volume buttons 161e including, for example, a volume up button 161f and a volume down button 161g, a terrestrial DMB antenna 141a for broadcast reception, and one or multiple microphones 162. The DMB antenna 141a may be fixed to the user device 100, or may be detachably formed in the user device 100.

A connector 165 may be formed in the lower side of the user device 100. The connector 165 may have multiple electrodes formed therein, and may be connected to the external devices by wires. An earphone jack 167 may be formed in the upper side of the user device 100. Earphones may be inserted into the earphone jack 167.

An input unit 168 may be mounted in the lower side of the user device 100. The input unit 168 may be kept inside the user device 100, and may be pulled out and detached from the user device 100 when the input unit 168 is in use.

Figure 4:
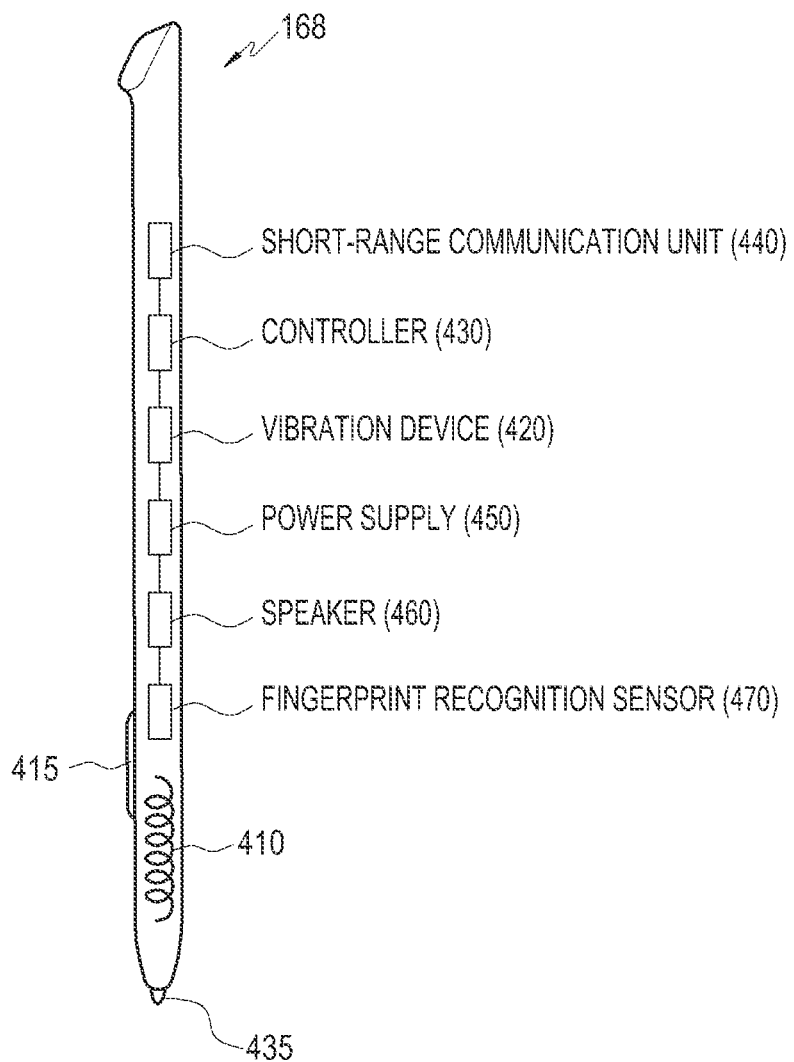
FIG. 4 illustrates an input unit according to various embodiments of the present disclosure.

FIG. 4 illustrates an input unit according to various embodiments of the present disclosure.

Referring to FIG. 4, according to various embodiments of the present disclosure, an input unit 168 (e.g., an Electro-Magnetic Resonance (EMR) pen) may include a penholder, a penpoint 435 disposed at an end of the penholder, a coil 410 disposed in an area adjacent to the penpoint 435 inside the penholder, a button 415, a vibration device 420, a controller 430 a short-range communication unit 440, and a power supply 450. The input unit 168 may also include a speaker 460 and/or the like. The controller 430 may be configured to analyze a control signal received from the user device 100, to control the vibration strength and vibration cycle of the vibration device 420, to control short-range communication, and to control detection of the handwriting pressure. The short-range communication unit 440 may be configured to perform short-range communication with the user device 100. The power supply 450 may be configured to supply the necessary power to the input unit 168. The input unit 168 may include a fingerprint recognition sensor 470 for recognizing the user's fingerprint. The fingerprint recognition sensor 470 may be mounted outside the input unit 168, and may determine a user by detecting the user's fingerprint. The input unit 168 may include a Resistance-Capacitance (RC) circuit used to perform communication with the user device 100, and the RC circuit may be included in the input unit 168, or may be incorporated into the controller 430. The input unit 168 may include a speaker 460 configured to output the sound corresponding to the vibration cycle and/or vibration strength of the input unit 168. The speaker 460 may output the sound at the time the sound is output from the speaker 163 mounted in the user device 100, or the speaker 460 may output the sound a predetermined time (e.g., 10 ms) before or after the sound is output from the speaker 163.

According to various embodiments of the present disclosure, the input unit 168 having such a structure may support an electromagnetic induction scheme. If a magnetic field is formed around a coil mounted at a certain point of the pen recognition device 121 by the coil 410, the pen recognition device 121 may recognize the position of the input unit 168 by detecting the position of the magnetic field.

More specifically, the speaker 460, under control of the controller 430, may output the sound corresponding to various signals (e.g., wireless signals, broadcast signals, digital audio files, digital video files, and/or the like) from the mobile communication unit, the sub-communication unit or the multimedia unit 150 in the user device 100. The speaker 460 may output the sound (e.g., button manipulation tones for phone calls, or ring back tones) corresponding to a function executed by the user device 100. One or multiple speakers 460 may be mounted in a proper position or positions of the housing of the input unit 168.

The controller 430 may analyze at least one control signal received from the user device 100 via the short-range communication unit 440, and control the vibration cycle and vibration strength of the vibration device 420 mounted in the input unit 168 depending on the analyzed control signal. The controller 430 may transmit a feedback signal corresponding to the received control signal, or input unit status information (e.g., battery level, communication status, identification information, and/or the like), to the user device 100. The control signal is a signal that is exchanged between the user device 100 and the input unit 168, and may be periodically exchanged for a predetermined time or until hovering is terminated. The power supply 450 for supplying power for operation of the controller 430 may be charged with the current induced from the user device 100. The control signal may be transmitted to the input unit 168 by at least one of the mobile communication unit and the sub-communication unit in the user device 100.

Figure 5:
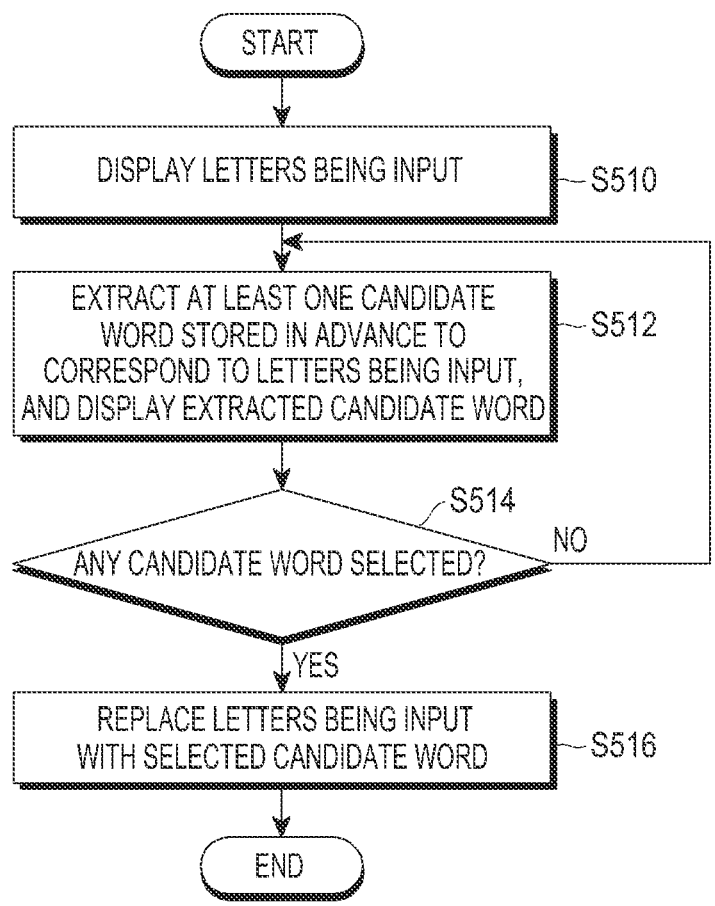
FIG. 5 is a flowchart illustrating a handwriting input method according to an embodiment of the present disclosure.

FIG. 5 is a flowchart illustrating a handwriting input method according to an embodiment of the present disclosure.

Referring to FIG. 5, at operation S510, when a user intends to create or draw up handwriting content, the screen 120 may display handwriting letters being input. The screen 120, under control of the controller 110, may display a string including letters, words, and/or at least one keyword (or word) being input. The screen 120 may display letters, words and/or keywords being input by at least one user. The displayed string may be stored in the storage unit 170 in units of at least one of letters, words, phrases, and sentences. The letter may include at least one of one syllable for Korean and one character for English. It will be apparent to those of ordinary skill in the art that various embodiments of the present disclosure may be applied not only to Korean and English, but also to a variety of other languages used in different countries, such as Japanese, Chinese, Russian, Spanish, Portuguese, and/or the like.

At operation S512, the controller 110 may display at least one candidate word stored in advance in response to the input letters. The screen 120 may display at least one candidate word for each user in response to the handwriting letters being input by at least one user. According to various embodiments of the present disclosure, the controller 110 may extract at least one candidate word stored in advance in response to the input handwriting letters, and display the extracted candidate word. The at least one candidate word may be a word including the input letters. For example, if the user desiring to input or enter a keyword (e.g., '학교 (school)') inputs the first syllable (e.g., '학'), the controller 110 may extract at least one candidate word using the input first syllable. The extracted at least one candidate word may include at least one word whose first syllable is the same as the input first syllable (e.g., '학'), such as '학생 (student)', '학교 (school)', '학부모 (parents)' and '학문 (study)', and may also include at least one word (e.g., '학교 (school)'). Each word may be singular in number, or may be plural in number due to the difference between the user's handwritings. The controller 110 may extract multiple words (e.g., '학교 (school)'), and the extracted multiple words (e.g., '학교 (school)') may be different from each other in terms of the handwritings. Similarly, if the user desiring to input a word (e.g., 'school') inputs the first character (e.g., 's'), the controller 110 may extract at least one candidate word using the input first character (e.g., 's'). The extracted at least one candidate word may include at least one word whose first character is the same as the input first character (e.g., 's'), such as 'student', 'school', 'study' and 'sister', and may also include at least one word (e.g., 'school'). Each word may be singular in number, or may be plural in number due to the difference between the user's handwritings. The controller 110 may extract multiple words (e.g., 'school'), and the extracted multiple words (e.g., 'school') may be different from each other in terms of the handwritings.

The controller 110 may convert the input letters into a text, and extract at least one candidate word corresponding to the text. The controller 110 may convert letters being input by at least one user into a text, and extract at least one candidate handwriting word corresponding to the letters input by each user in response to the converted text. The controller 110 may convert the input letters into a code, and extract at least one candidate word using the code. Each candidate word may be stored in advance in the storage unit 170 after being converted into a text, and a font of each candidate word may correspond to the font created in advance by the user, or the font provided by default in the user device 100. The at least one candidate word may be stored in the storage unit 170 after a priority of the at least one candidate word is determined using at least one of storage order, input frequency for the word input by the user, and relationship between the input word and a word adjacent thereto. The fonts may vary depending on the language, and may include a variety of fonts such as Gungseoche, Myoungjoche, Goolimche and Batangche, for Korean. The at least one candidate word may include a word that is the same as, or similar to a word including the input handwriting letters. The at least one candidate word may be displayed in a separate pop-up window on the screen 120. For the pop-up window, a size and/or display position thereof may be variably adjusted depending on at least one of the number of candidate words, the types of candidate words, and the number of words with the same meaning. The at least one candidate word may include a plurality of the same words, and the plurality of the same words may be included in (or may belong to) at least one candidate word, because each time the word is handwritten by the user, its handwriting may be different. Specifically, the same words may be included in the candidate word, because even though the user handwrites the same word, the handwriting or the pixels in the area at which the word is handwritten may be different. The displayed at least one candidate word may be displayed on the screen 120 by being applied in real time in response to the input letters.

The controller 110 may display the word including the handwriting letters being input on the screen 120 in a shaded way. If the first syllable (e.g., '학') is input, the controller 110 may display a word with the highest priority on the screen 120 in a shaded way. The priority may be determined using at least one of storage order, input frequency, relationship with an adjacent word, and the like for the word being input. For example, as the first syllable (e.g., '학') is input, the controller 110 may display at least one remaining syllable (e.g., '교') except for the first syllable (e.g., '학') of the word (e.g., '학교 (school)') with the highest priority, on the screen 120 in a shaded way. Similarly, in the case of English, as the first character (e.g., 's') is input, the controller 110 may display at least one remaining character (e.g., 'chool') except for the first character (e.g., 's') of the word (e.g., 'school') with the highest priority, on the screen 120 in a shaded way. For example, as the first character is input, the controller 110 may display recommended remaining characters corresponding to a recommended candidate word.

At operation S514, the controller 110 may determine whether any candidate word is selected.

If the controller 110 determines that no candidate word is selected at operation S514, then the controller 110 may proceed to operation S512.

In contrast, if the controller 110 determines that any candidate word is selected at operation S514, then the controller 110 may proceed to operation S516 at which the controller 110 may replace the word being input with the selected candidate word, and display the replacement results. The controller 110 may replace the word being input by each user with any candidate word selected by each user, and display the replacement results on the screen 120. At least one candidate word may be displayed depending on its priority based on the first syllable or the first character that is input to the screen 120. If any candidate word is selected by the user while the at least one candidate word is displayed, the selected candidate word may be displayed on the screen 120, replacing the word being input. The arbitrary candidate word may be a word the user desires to input. For example, if the user desiring to input a word (e.g., '학교 (school)') inputs the first syllable (e.g., '학'), the controller 110 may extract at least one candidate word using the input first syllable (e.g., '학'), and display the extracted at least one candidate word on the screen 120 depending on a priority of the extracted at least one candidate word. If a candidate word (e.g., '학교 (school)') is selected by the user while the at least one candidate word is displayed, the controller 110 may replace the input first syllable (e.g., '학') with the selected candidate word (e.g., '학교 (school)'), and display the replacement results (e.g., '학교 (school)') on the screen 120. According to various embodiments of the present disclosure, through the above process, the user is enabled to create handwriting content. A more detailed example of the handwriting input method according to various embodiments of the present disclosure will be described with reference to FIGS. 6A to 6C.

Figures 6A, 6B, 6C:
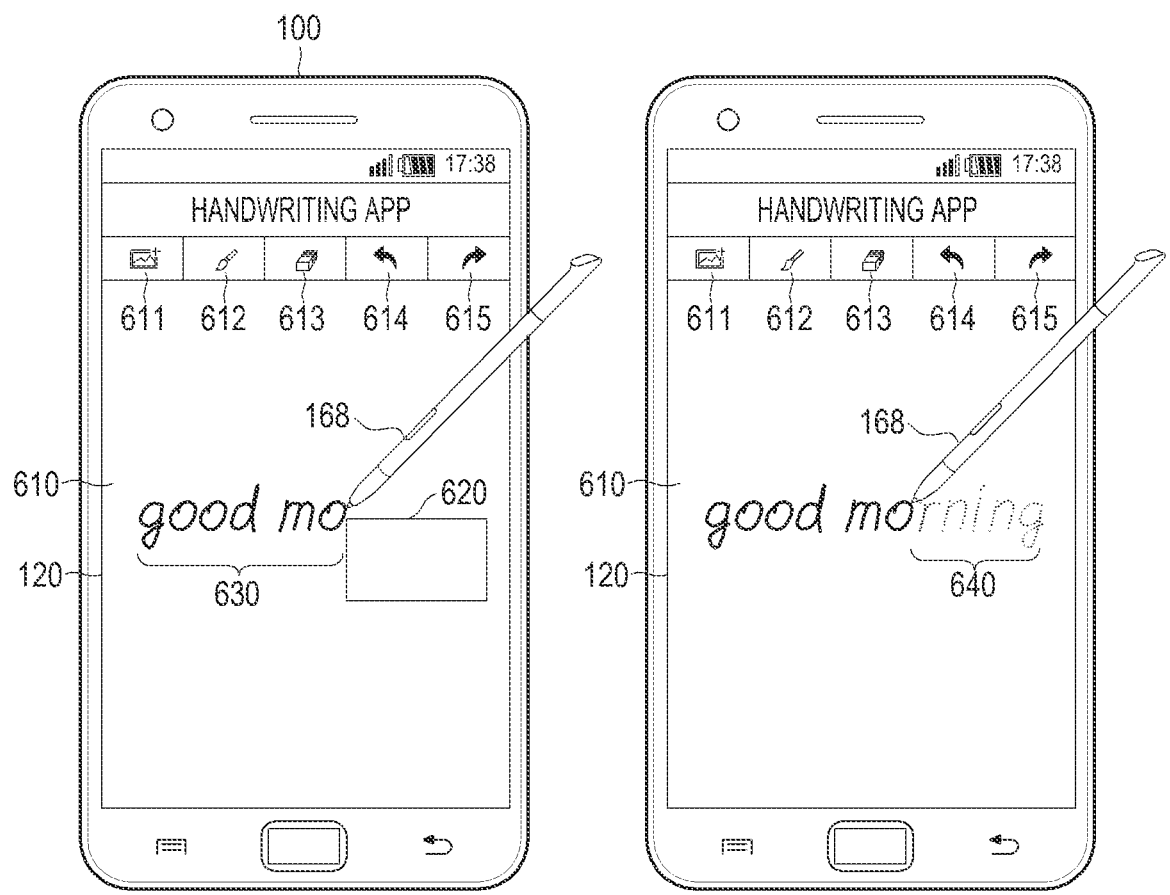
FIG. 6A illustrates an example of displaying at least one candidate word corresponding to letters being input according to an embodiment of the present disclosure.
FIG. 6B illustrates an example of displaying a keyword corresponding to letters being input in a shaded way according to an embodiment of the present disclosure.
FIG. 6C illustrates at least one candidate word corresponding to letters being input according to an embodiment of the present disclosure.

FIGS. 6A to 6C illustrate an example of a handwriting input method according to an embodiment of the present disclosure.

Specifically, FIG. 6A illustrates an example of displaying at least one candidate word corresponding to letters being input according to an embodiment of the present disclosure, FIG. 6B illustrates an example of displaying a keyword corresponding to letters being input in a shaded way according to an embodiment of the present disclosure, and FIG. 6C illustrates at least one candidate word corresponding to letters being input according to an embodiment of the present disclosure.

Referring to FIG. 6A, a handwriting application 610 may be displayed on the screen 120 of the user device 100. The handwriting application 610 may be provided with at least one function that is to be applied to handwriting content being input. The at least one function may include a background menu 611 for attaching at least one of photos, images, emoticons, and the like, or for changing the background in which handwriting content is displayed, a pen settings menu 612 for setting the pen type, thickness, color, and/or the like to be applied to a string being input; a clear menu 613 for clearing the created letters or drawings, an undo menu 614 for undoing the created letters or drawings, and a redo menu 615 for redoing the deleted or undone content.

If the user inputs a string 630 to the handwriting application 610 using the input unit 168, a pop-up window 620 may be displayed, which includes at least one candidate word corresponding to at least one letter (e.g., 'mo') that is currently being input or was most recently input, in the input string 630. The at least one candidate word displayed in the pop-up window 620 may be different depending on the input letters. For example, if the letter being input is 'm', at least one candidate word corresponding to the input letter (e.g., 'm') may be displayed in the pop-up window 620 depending on the priority. If at least one letter being input is 'mo', at least one candidate word corresponding to the input at least one letter (e.g., 'mo') may be displayed in the pop-up window 620 depending on the priority. More specifically, if a letter being input is 'm', at least one candidate word may include at least one word whose first character starts with 'm', or may include at least one word whose first character starts with 'm', among the words drawn up in advance by the user. For example, if the letter being input is 'm', the at least one candidate word may include a variety of words starting with 'm', such as 'mom', 'Monday', 'melon', 'miracle' and 'mystery', and may also include at least one word corresponding to a variety of handwritings, for each of the words. If 'mo' is input to the handwriting application 610 as the user inputs 'o' after inputting the first character 'm', at least one candidate word may include a variety of words starting with 'mo', such as 'mom', 'Monday', 'morning' and 'mother', and may also include at least one word corresponding to a variety of handwritings, for each of the words. At least one word included in the pop-up window 620 may be changed, deleted or added in response to the at least one syllable or at least one character being input. The change, deletion, or addition may be applied in real time to the syllable or character being input. According to various embodiments of the present disclosure, the user is enabled to variably adjust the position and size of the displayed pop-up window 620. In response to the adjustment of the size of the pop-up window 620, the number of candidate words displayed in the pop-up window 620 may be adjusted depending on respective priorities of the candidate words. The pop-up window 620 will be described in more detail below with reference to FIG. 6C.

Referring to FIG. 6B, if at least one letter that is currently being input with the input unit 168 is 'mo', the pop-up window 620 including at least one word (e.g., 'mom', 'Monday', 'morning', 'mother', and the like) corresponding to the input letters 'mo' may be displayed as illustrated in FIG. 6A. For a variety of candidate words included in the pop-up window 620, respective priorities thereof may be determined based on at least one of storage order, input frequency, relationship with a word adjacent to the input word or letters (e.g., 'mo'), and/or the like. In this case, the controller 110 may display the remaining syllables or characters 640 (e.g., 'rning') of a word with the highest priority among the candidate words on the screen 120 in a shaded way in response to the at least one letter (e.g., 'mo') being input.

According to various embodiments of the present disclosure, the controller 110 may display candidate words so as to display less than a threshold number of candidate words. The controller 110 may determine which candidate words to display based on an order of priorities (e.g., so as to display the candidate words having higher relative priorities).

According to various embodiments of the present disclosure, the controller 110 may display both or at least one of the pop-up window 620 described in FIG. 6A and the remaining characters 640 described in FIG. 6B on the screen 120. The position at which the remaining characters 640 (e.g., 'rning') are displayed in a shaded way and the position at which the pop-up window 620 is displayed, may or may not overlap on the screen 120.

Referring to FIG. 6C, if a string is input, the pop-up window 620 may be displayed, which includes at least one candidate word corresponding to at least one letter (e.g., 'mo') that is currently being input or was most recently input, in the input string. The at least one candidate word displayed in the pop-up window 620 may be different depending on the input letters. As in the case of the example illustrated in FIG. 6A, if at least one letter being input is 'mo', the pop-up window 620 may display at least one candidate word corresponding to the input at least one letter (e.g., 'mo'). The at least one candidate word may include 'morning' 621, 'monday' 624, 'mother' 625', and the like, all of which start with the input at least one letter (e.g., 'mo'), and may also include at least one word 622 and 623 corresponding to a variety of handwritings for the word 'morning' with the highest priority among the at least one candidate words. Although the at least one words 621, 622 and 623 are the same words, the respective handwritings thereof may be different from each other because the words are handwritten by the user. The at least one words 621, 622 and 623 may be listed in order of good handwriting or recently input word. The at least one word included in the pop-up window 620 may be a word stored in advance in the storage unit 170, or a word received over the Internet. According to various embodiments of the present disclosure, the plurality of same words may be displayed so as to allow the user to select a preferred one of the plurality of displayed same words.

Figure 7:
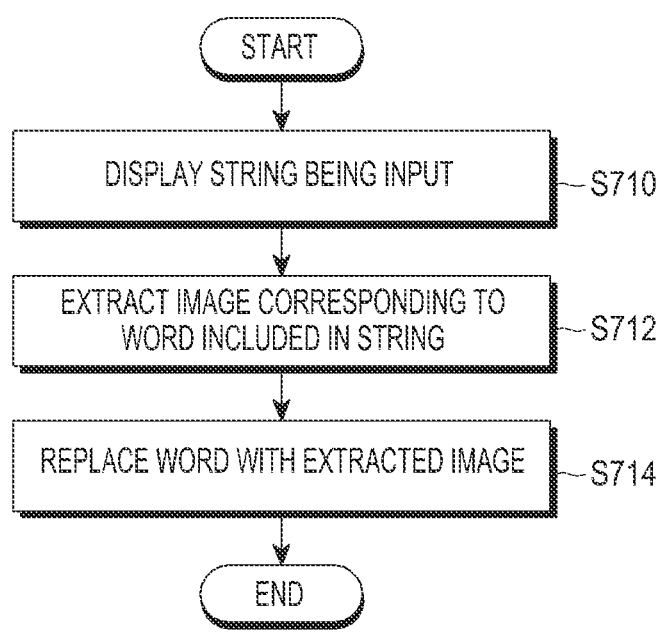
FIG. 7 is a flowchart illustrating a handwriting input method according to an embodiment of the present disclosure.

FIG. 7 is a flowchart illustrating a handwriting input method according to an embodiment of the present disclosure.

Referring to FIG. 7, at operation S710, when the user desires to create or draw up handwriting content, the screen 120 may display a string being input. The screen 120, under control of the controller 110, may display a string including letters, words or at least one word being input. The screen 120 may display the letters, words or keywords being input by at least one user. The displayed string may be stored in the storage unit 170 in units of at least one of letters, words, phrases, and sentences. The letter may include at least one of one syllable for Korean and one character for English.

At operation S712, the controller 110 may extract an image corresponding to at least one word included in the string being input. The controller 110 may extract at least one image corresponding to a word included in the string being input. The controller 110 may extract at least one candidate word for each user in response to the handwriting letters being input by at least one user. The controller 110 may convert a word included in the string being input into a code, and extract an image that is matched to the code in advance. The controller 110 may analyze a word included in the string being input, and extract an image corresponding to the input word based on the analysis results. For example, if the user inputs a word '택시 (taxi)', the controller 110 may extract at least one image corresponding to the input word '택시 (taxi)' from the storage unit 170. The image may be an image that is stored in advance in the storage unit 170, or an image that is received through a communication scheme such as the Internet. The controller 110 may analyze a word included in the string being input. In the case in which the analyzed word corresponds to an email address, if the email address is selected, properties or attributes of the analyzed word may be changed so that an email application may be executed. In the case in which the analyzed word corresponds to a phone number, if the phone number is selected, the controller 110 may change properties of the analyzed word so that a phone call may be executed. According to various embodiments of the present disclosure, a handwriting input method may be implemented by selecting an input word corresponding not only to the email address and phone number, but also to a variety of other functions such as a video function, a messaging function, a photo capture function, and/or the like.

The controller 110 may convert the word being input into a text, and extract at least one image corresponding to the text. The controller 110 may convert handwriting letters being input by at least one user into a text, and extract at least one candidate word corresponding to the handwriting letters being input by each user in response to the converted text. The controller 110 may convert the word being input into a code, and extract at least one image using the code. Each image may be stored in advance in the storage unit 170 after being matched to its associated word using the text or the code. The at least one image may be stored in the storage unit 170 after a priority thereof is determined using at least one of storage order, selection frequency for the word input by the user, and relationship between the input word and its adjacent word. The at least one image may be displayed in a separate pop-up window on the screen 120. For the pop-up window, a size or a display position thereof may be variably adjusted depending on at least one of the number of images, the types of images, the number of images with the same meaning, and/or the like. As for the at least one image, a plurality of images may be included in (or may belong to) the same word. For example, in the case of dogs, there may be a plurality of images corresponding to a variety of dogs depending on the types of dogs, so the images corresponding to a variety of dogs may be included in the at least one image. The displayed at least one image may be displayed on the screen 120 by being applied in real time in response to the word being input.

At operation S714, the controller 110 may replace the word with the extracted image and display the replacement results. An image corresponding to the word being input to the screen 120 may be extracted, and the extracted image may be displayed on the screen 120, replacing the word being input. The controller 110 may replace the word being input by each user with the extracted image for each user, and display the replacement results on the screen 120. As for the extraction of an image corresponding to the word being input, if the user matches words with associated images in advance, or if there are file names of images, the controller 110 may convert the word being input into a text, and extract an image matching with the text. The controller 110 may extract an image and replace the word being input with the extracted word in real time, in response to an input of the word. Alternatively, after the content that the user desires to input is fully created, the controller 110 may extract an image corresponding to at least one word included in the content and replace the word with the extracted image. If the input of the word is completed, the controller 110 may replace the input word with the extracted image in response to the input of the word, and display the replacement results. Alternatively, after the string being input is completed, or after the desired handwriting content is fully created or input, the controller 110 may extract at least one image corresponding to at least one word included in the completely input string, replace the word with the extracted image, and display the replacement results. Another example of the handwriting input method according to various embodiments of the present disclosure will be described in more detail with reference to FIGS. 8A to 8H.

FIGS. 8A to 8H illustrate an example of creating handwriting content by inputting a string according to an embodiment of the present disclosure.

Figure 8A:
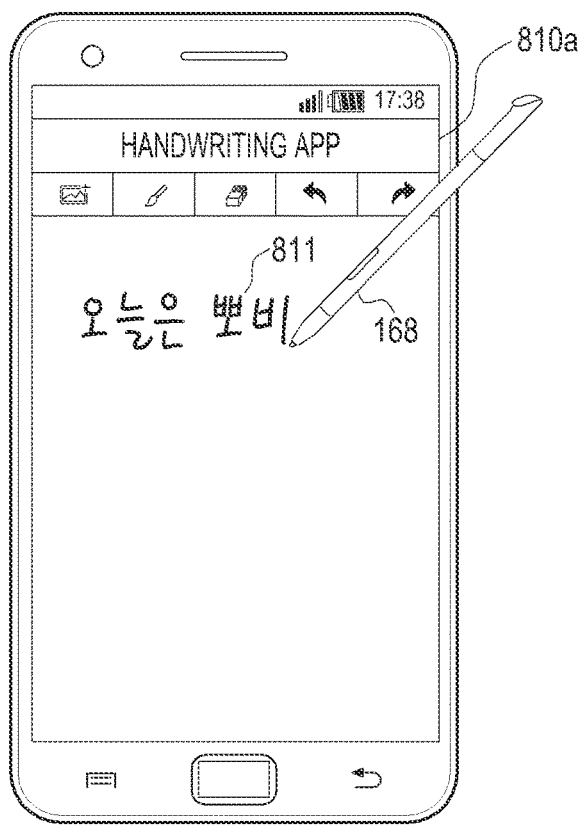
FIG. 8A illustrates an example of displaying a string being input according to an embodiment of the present disclosure.
Figure 8B:
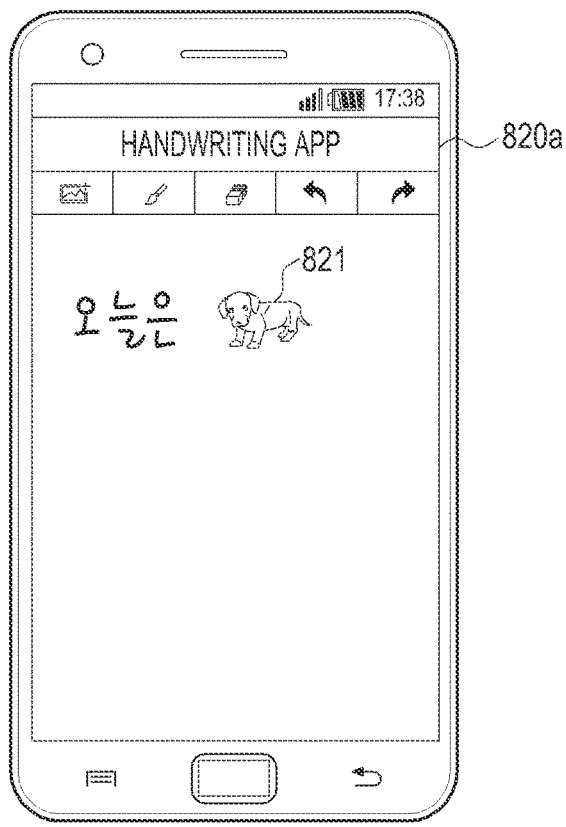
FIG. 8B illustrates an example of replacing a word corresponding to a string being input with an image according to an embodiment of the present disclosure.
Figure 8C:
FIG. 8C illustrates an example of a completely input string according to an embodiment of the present disclosure.
Figure 8D:
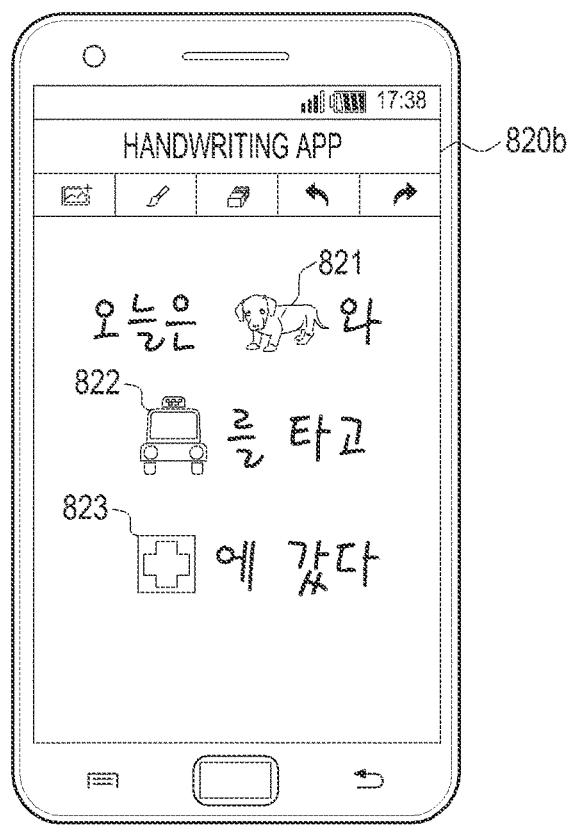
FIG. 8D illustrates an example of replacing at least one keyword included in a completely input string with an image according to an embodiment of the present disclosure.
Figure 8E:
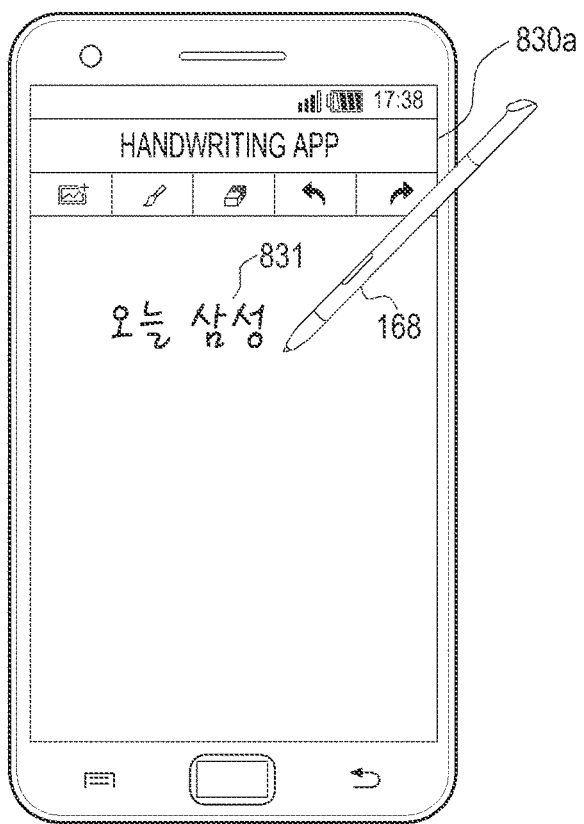
FIG. 8E illustrates an example of displaying a string being input according to an embodiment of the present disclosure.
Figure 8F:
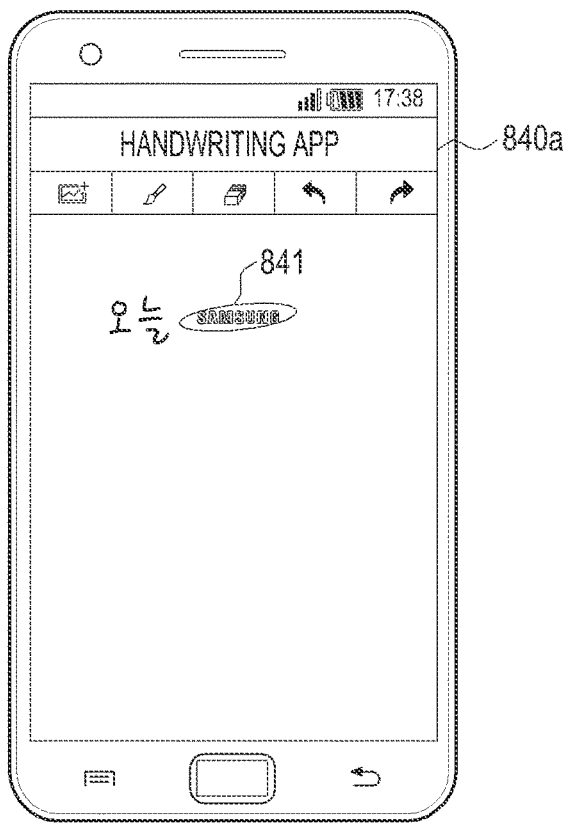
FIG. 8F illustrates an example of replacing a word corresponding to a string being input with an image according to an embodiment of the present disclosure.
Figure 8G:
FIG. 8G illustrates an example of a completely input string according to an embodiment of the present disclosure.
Figure 8H:
FIG. 8H illustrates an example of changing properties of at least one keyword included in a completely input string according to an embodiment of the present disclosure.

Specifically, FIG. 8A illustrates an example of displaying a string being input according to an embodiment of the present disclosure, FIG. 8B illustrates an example of replacing a word corresponding to a string being input with an image according to an embodiment of the present disclosure, FIG. 8C illustrates an example of a completely input string according to an embodiment of the present disclosure, FIG. 8D illustrates an example of replacing at least one keyword included in a completely input string with an image according to an embodiment of the present disclosure, FIG. 8E illustrates an example of displaying a string being input according to an embodiment of the present disclosure, FIG. 8F illustrates an example of replacing a word corresponding to a string being input with an image according to an embodiment of the present disclosure, FIG. 8G illustrates an example of a completely input string according to an embodiment of the present disclosure, and FIG. 8H illustrates an example of changing properties of at least one word included in a completely input string according to an embodiment of the present disclosure.

Referring to FIG. 8A, a screen 810a may display a string that is being created or handwritten by the user with the input unit 168. The string being input may include a word (e.g., '뽀비 (Ppobi)') that can be replaced with an image. In the case where the string being input is '오늘 (Today)은 뽀비 (Ppobi)', if the input of the word '뽀비 (Ppobi)' 811 is completed, the controller 110 may convert the input word '뽀비 (Ppobi)' 811 into a text, determine whether an image corresponding to the input word '뽀비 (Ppobi)' 811 is present in the storage unit 170, using the text, and extract the image depending on the determination results. The controller 110 may replace the input word '뽀비 (Ppobi)' 811 with the extracted image as illustrated in FIG. 8B.

Referring to FIG. 8B, if the word '뽀비 (Ppobi)' 811, which can be replaced with an image in the string being input, is input in FIG. 8A, the controller 110 may determine whether an image 821 corresponding to the input word '뽀비 (Ppobi)' 811 is present in the storage unit 170, replace the input word '뽀비 (Ppobi)' 811 with the extracted image 821, and display the replacement results on a screen 820a. If there is no image used for replacing the input word '뽀비 (Ppobi)' 811, the controller 110 may extract at least one image used for replacing the input word '뽀비 (Ppobi)' 811 from the storage unit 170, or download an image over the Internet, and recommend the extracted or downloaded image to the user.

Referring to FIG. 8C, a screen 810b may display a string that is being created or handwritten by the user with the input unit 168. The string being input may include a word (e.g., '뽀비 (Ppobi)', '택시 (taxi)', '병원 (hospital)') that can be replaced with an image. If the string being input is '오늘(Today)은 뽀비(Ppobi)와 택시(taxi)를 타고 병원(hospital)에 갔다 (went)', the controller 110 may convert the input words '뽀비 (Ppobi)' 811, '택시 (taxi)' 812 and '병원 (hospital)' 813 into respective associated texts, determine whether images corresponding to the input words '뽀비 (Ppobi)' 811, '택시 (taxi)' 812 and '병원 (hospital)' 813 are present in the storage unit 170, using the texts, and extract the images depending on the determination results. The controller 110 may simultaneously replace the input words '뽀비 (Ppobi)' 811, '택시 (taxi)' 812 and '병원 (hospital)' 813 with respective associated extracted images, as illustrated in FIG. 8D.

Referring to FIG. 8D, the controller 110 may simultaneously replace, on a screen 820b, the input words '뽀비 (Ppobi)' 811, '택시 (taxi)' 812 and '병원 (hospital)' 813 with respective associated extracted images corresponding to at least one word (e.g., '뽀비 (Ppobi)' 811, '택시 (taxi)' 812 and '병원 (hospital)' 813) included in the string that was input in FIG. 8C. Specifically, as illustrated in FIG. 8D, the controller 110 may simultaneously replace the input word '뽀비 (Ppobi)' 811 with a '뽀비 (Ppobi)' image 821 extracted in response to the input word '뽀비 (Ppobi)' 811, replace the input word '택시 (taxi)' 812 with a '택시 (taxi)' image 822 extracted in response to the input word '택시 (taxi)' 812, and replace the input word '병원 (hospital)' 813 with a '병원 (hospital)' image 823 extracted in response to the input word '병원 (hospital)' 813.

Referring to FIG. 8E, a screen 830a may display a string that is being created or handwritten by the user with the input unit 168. The string being input may include a word (e.g., '삼성 (Samsung)') that can be replaced with an image. In the case in which the string being input is '오늘 (Today) 삼성 (Samsung)', if the input of the word '삼성 (Samsung)' 831 is completed, the controller 110 may convert the input word '삼성 (Samsung)' 831 into a text, determine whether an image corresponding to input word '삼성 (Samsung)' 831 is present in the storage unit 170, using the text, and extract the image depending on the determination results. The controller 110 may replace the input word '삼성 (Samsung)' 831 with the extracted image as illustrated in FIG. 8F.

Referring to FIG. 8F, if the word '삼성 (Samsung)' 831, which can be replaced with an image in the string being input, is input in FIG. 8E, the controller 110 may determine whether an image (e.g., Samsung logo) 841 corresponding to the input word '삼성 (Samsung)' 831 is present in the storage unit 170, replace the input word '삼성 (Samsung)' 831 with the extracted image 841, and display the replacement results on a screen 840a. If there is no image used for replacing the input word '삼성 (Samsung)' 831, the controller 110 may extract at least one image used for replacing the input word '삼성 (Samsung)' 831 from the storage unit 170, or download an image over the Internet, and recommend the extracted or downloaded image to the user.

Referring to FIG. 8G, a screen 830*b* may display a string that is being created or handwritten by the user with the input unit 168. The string being input may include a keyword (e.g., '삼성 (Samsung)') that can be replaced with an image, and a keyword (e.g., at least one of 000@samsung.com and http://www.samsung.com) whose properties can be changed. As for the change in properties, if at least one keyword included in the string is selected, the controller 110 may change the properties of the keyword so that a program or application corresponding to the selected keyword may be executed. The changing of the properties may include not only the Internet access and email transfer, but also storage in the user device 100, or going to the path to any file or application stored or installed in the user device 100. If the string being input is '오늘 (Today) 삼성 (Samsung) 의 최근 소식 (latest news) 을 http://www.samsung.com 에 접속 (access) 하여 파악하고 결과 (results) 를 000@samsung.com 으로 보냈다 (sent)', the controller 110 may convert the input keyword '삼성 (Samsung)' 831 into a text, determine whether an image corresponding to the input keyword '삼성 (Samsung)' 831 is present in the storage unit 170, using the text, and extract the image depending on the determination results. In addition, the controller 110 may convert each of the input email address 832 and URL address 833 into a text, and determine whether the input word correspond to an email address. If the email address 832 is selected, the controller 110 may change properties of the email address 832 so that an email application may be executed. If the URL address 833 is selected, the controller 110 may change properties of the URL address 833 so that an Internet access application may be executed. As to the change in properties, if an address is selected as a hyperlink, properties of the email address may be changed so that a separate window may be open or so that the email address may be selected, the properties may be changed so that an email application may be executed. An email address of a sender may be an email address of the original user of the user device 100. As to the change in properties, the properties may be changed so that an Internet access application capable of accessing a URL may be executed, or may include going to the path to any file or application stored or installed in the user device 100. The controller 110 may simultaneously replace the input words with respective associated extracted image and words whose properties are changed, as illustrated in FIG. 8D.

Referring to FIG. 8H, as illustrated on the screen 840*b*, the controller 110 may simultaneously replace the input words with their associated extracted image and keywords (or words) whose properties are changed, in response to at least one keyword (or word) included in the string that was input in FIG. 8G, or may change properties of the input words. As illustrated in FIG. 8H, the controller 110 may simultaneously replace the input word '삼성 (Samsung)' 831 with the '삼성 (Samsung)' image 841 extracted in response to the input word '삼성 (Samsung)' 831, replace the input email address 832 with an email address 842 whose properties are changed, in response to the input email address 832, and replace the input URL address 833 with a URL address 843 whose properties are changed, in response to the input URL address 833. As illustrated, the replacing keywords 842 and 843 may be underlined to help the user know the change in the properties. Alternatively, for the replacing keywords 842 and 843, colors of the keywords may be changed, or their font may be changed to a variety of fonts such as Gungseoche, Myoungjoche, Goolimche and Batangche, to help the user know the change in the properties.

Figure 9:
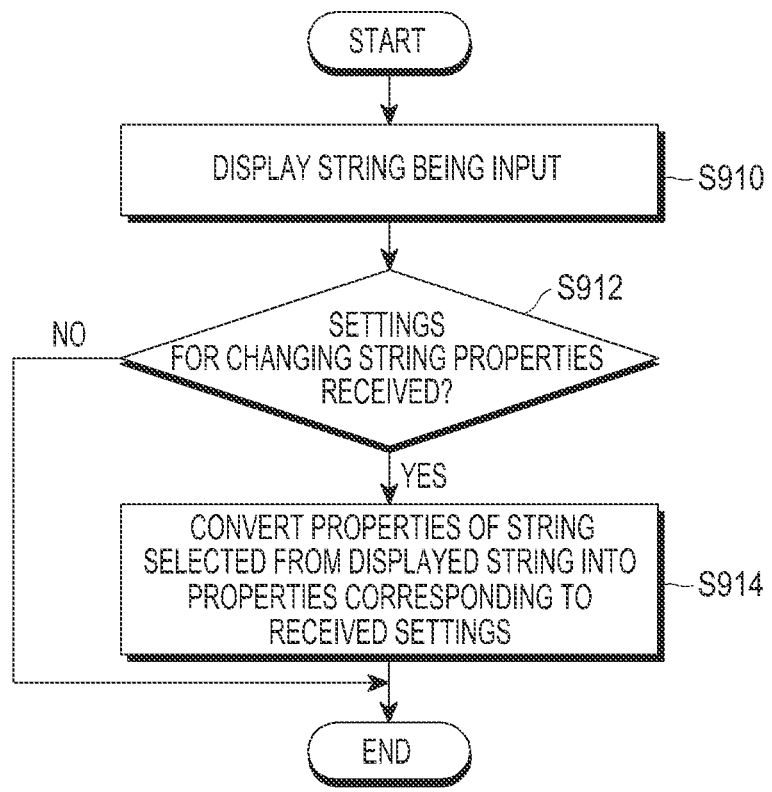
FIG. 9 is a flowchart illustrating a handwriting input method according to an embodiment of the present disclosure.

FIG. 9 is a flowchart illustrating a handwriting input method according to an embodiment of the present disclosure.

Referring to FIG. 9, at operation S910, if the user desires to create or draw up handwriting content, the screen 120 may display letters or a string being input. The screen 120, under control of the controller 110, may display a string including letters, words or at least one word being input. The displayed string may be stored in the storage unit 170 in units of at least one of letters, words, phrases and sentences. The letter may include at least one of one syllable for Korean and one character for English.

At operation S912, the controller 110 may determine whether settings for changing string properties is received.

If the controller 110 determines that settings for changing properties of the string are input at operation S912, then the controller 110 may proceed to operation S914 at which the controller 110 may change properties of the string selected from the displayed string into properties corresponding to the input settings, and display the change results. The controller 110 may change properties of the string displayed on the screen 120. The changing of the properties may be achieved using a function of a handwriting application capable of receiving a string. The settings may include at least one of pen-type, string's thickness and string's color settings to be applied to a string being created in a handwriting application. In addition to the pen-type, thickness and color settings, various embodiments of the present disclosure may provide a variety of other settings that can be applied to letters or strings. If the user creates handwriting content with the input unit 168, or creates handwriting content using the user's finger, the controller 110 may display the handwriting content being created in the handwriting application, in real time. If at least one word or letter is selected from the input string by the input unit 168 or the finger, the controller 110 may determine that properties of the selected at least one word or letter can be changed. The at least one word or letter may be selected based on at least one of trajectory of the input unit 168 and an area defined by the trajectory of the input unit 168. According to various embodiments of the present disclosure, the user may be allowed to select at least one word using the finger instead of the input unit 168. If trajectory is input to select at least one word, the controller 110 may display the trajectory in response to the settings.

In contrast, if the controller 110 determines that settings for changing properties of the string are not input at operation S912, then the controller 110 may end the handwriting input method.

FIGS. 10A to 10D illustrate examples of changing properties of a string being input according to an embodiment of the present disclosure.

Figure 10A:
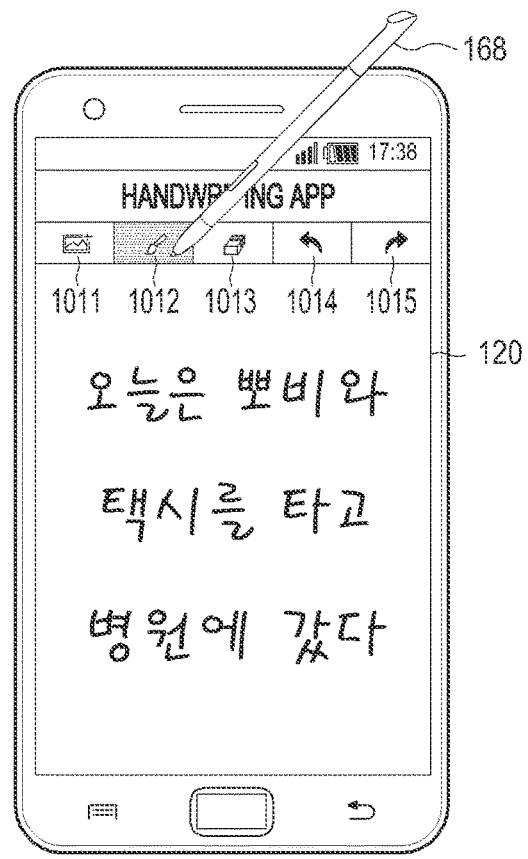
FIG. 10A illustrates an example of displaying a string being input according to an embodiment of the present disclosure.
Figure 10B:
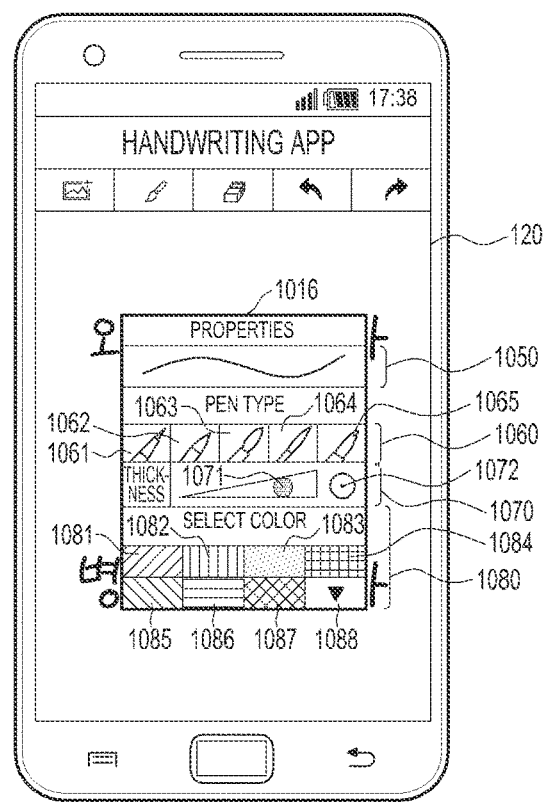
FIG. 10B illustrates an example of changing properties of a string being input according to an embodiment of the present disclosure.
Figure 10C:
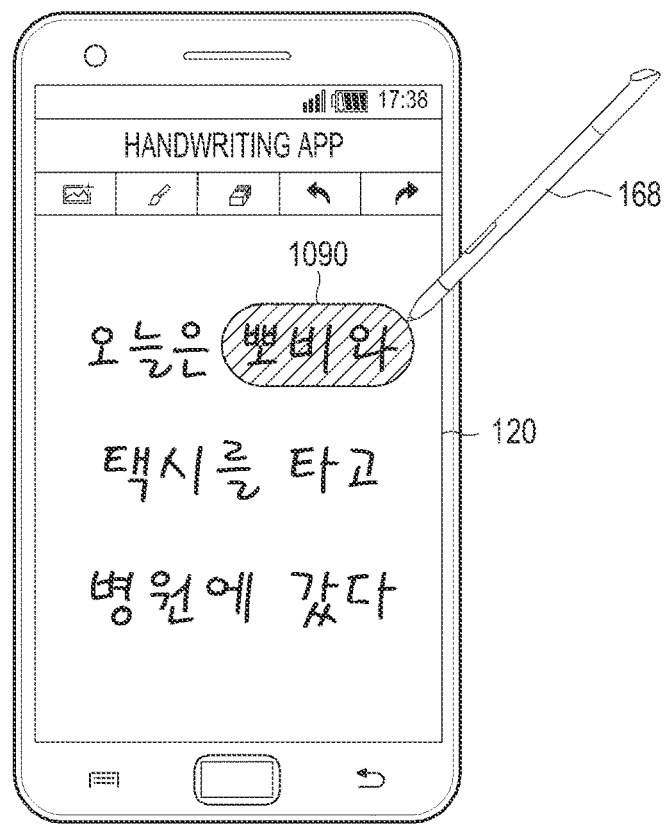
FIG. 10C illustrates an example of selecting at least one word from an input string according to an embodiment of the present disclosure.
Figure 10D:
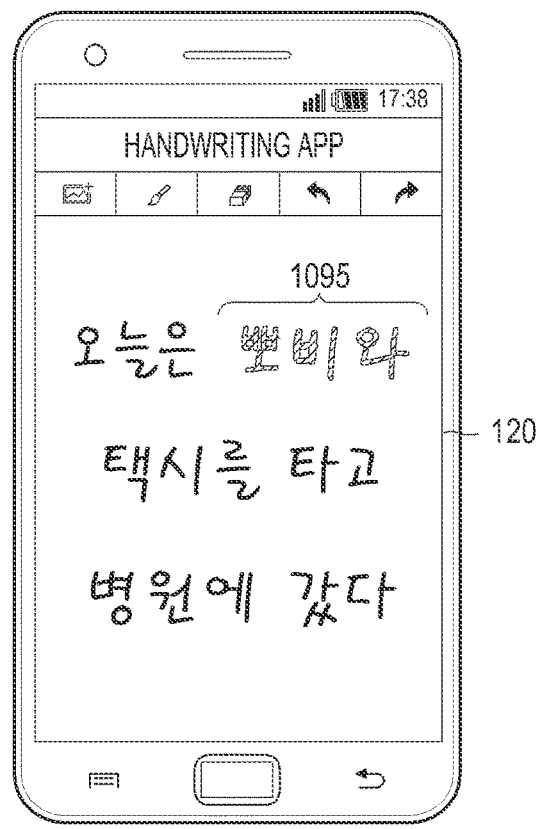
FIG. 10D illustrates an example of changing properties of a selected at least one word according to an embodiment of the present disclosure.

Specifically, FIG. 10A illustrates an example of displaying a string being input according to an embodiment of the present disclosure, FIG. 10B illustrates an example of changing properties of a string being input according to an embodiment of the present disclosure, FIG. 10C illustrates an example of selecting at least one word from an input string according to an embodiment of the present disclosure, and FIG. 10D illustrates an example of changing properties of a selected at least one word according to an embodiment of the present disclosure.

Referring to FIG. 10A, the screen 120 may display a string being created or handwritten by the input unit 168 using a handwriting application. The handwriting application may provide at least one function capable of changing properties of the string being input. The handwriting application may provide a variety of functions for changing properties of the string being input. The at least one function may include a background menu 1011 for attaching at least one of photos, images, emoticons, and/or the like, or changing the background on which handwriting content is displayed, a pen settings menu 1012 for setting the pen type, thickness, color, and/or the like to be applied to a string being input, a clear menu 1013 for clearing the created letters or drawings, an undo menu 1014 for undoing the created letters or drawings, and a redo menu 1015 for redoing the deleted or undone content. Any one of the provided menus may be selected by the user with the input unit 168. The input unit 168 has the structure illustrated in FIG. 4. If the pen settings menu 1012 is selected to change properties of the string being input, a pop-up window 1016 used to change the properties may be displayed as illustrated in FIG. 10B.

Referring to FIG. 10B, if the Pen Settings menu 1012 is selected, the pop-up window 1016 used to change properties of the string displayed on the screen 120 may be displayed (e.g., the pop-up window may be displayed so as to overlay the string being input). The pop-up window 1016 may be opaquely displayed on the string being input, making the string being input temporarily invisible, or may be semi-transparently displayed, making the string being input faintly visible. If the pen settings menu 1012 is selected using the input unit 168, the controller 110 may display the pop-up window 1016 used to change properties of the pen on the screen 120 to change the properties of the string. The pop-up window 1016 may include a preview menu 1050 provided to show the properties applied to the pen in a preview way, a pen type menu 1060 provided to display a plurality of pens, an adjust thickness menu 1070 used to adjust the thickness of any selected pen, and a select color menu 1080 used to choose a color of the selected pen.

The pen type menu 1060 in the pop-up window 1016 may display various types of pens such as a ballpoint pen 1061, a pencil 1062, a brush 1063, a fountain pen 1064, and a marker pen 1065. It will be apparent to those of ordinary skill in the art that in addition to the above-identified pen types, various embodiments of the present disclosure may provide a variety of other pens that can be applied to the string being input. If any one of the plurality of pens is selected by the input unit 168, the controller 110 may display the selected pen in a preview way. While the handwriting application is displayed or executed, the user may adjust the letter's thickness for the selected pen and select the color thereof, using the input unit 168. Types of the plurality of pens are listed or displayed in the pop-up window 1016, and any one (e.g., the marker pen 1065) of the listed multiple pens may be selected by the input unit 168. If the user desires to adjust the thickness of the selected marker pen 1065, the user may adjust the thickness of the selected pen by shifting left or right a thickness button 1071 on the adjust thickness menu 1070. The thickness-adjusted results may be displayed in a predetermined area 1072 in a preview way. On the select color menu 1080 may be listed a variety of colors 1081 to 1087. In addition to the seven colors (e.g., red 1081, orange 1082, yellow 1083, green 1084, blue 1085, navy 1086 and purple 1087), various embodiments of the present disclosure may provide a wide variety of colors, and the user may select a menu 1088 to see more colors.

Referring to FIG. 10C, if the input of settings for changing properties of the string being input is completed as illustrated in FIG. 10B after the input of the string is completed, the controller 110 may enter a standby state for changing properties of the string selected by the input unit 168. According to various embodiments of the present disclosure, the user may be allowed to input settings for changing properties of the string after the input of the string is completed, or may allow the user to change properties of the string while inputting the string. If trajectory of the input unit 168 is detected on the screen 120, the controller 110 may display the detected trajectory on the screen 120, enabling the user to recognize that a word or string corresponding to the detected trajectory is selected. For example, in the case in which the string displayed on the handwriting application is '오늘 (Today) 은 뽀비 (Ppobi)와 택시 (taxi)                        를 타고 병원 (hospital) 에 갔다 (went)', if at least one word or string (e.g., '뽀비 (Ppobi) 와 ') is selected by the input unit 168, the controller 110 may display an area 1090 of the selected word or string in a shaded way, allowing the user to recognize the selected word (e.g., '뽀비 (Ppobi) 와 ') or string. The controller 110 may detect the selection of at least one word, using at least one of the trajectory of the input unit 168 and the area defined by the trajectory of the input unit 168, in the displayed string. The controller 110 may display at least one of the trajectory of the input unit 168 and the area defined by the trajectory of the input unit 168, in response to the settings.

Referring to FIG. 10D, if the at least one word (e.g., '뽀비 (Ppobi)와 ') is selected as illustrated in FIG. 10C, the selected word (e.g., '뽀비 (Ppobi)와 ') may be displayed as a word '뽀비 (Ppobi) 와 ' 1095 as illustrated in FIG. 10D after properties thereof are changed according to the settings that are input in FIG. 10B. According to various embodiments of the present disclosure the process of changing properties of at least one word or string may be performed once or multiple times. It will be apparent to those of ordinary skill in the art that various embodiments of the present disclosure may be applied to special characters in addition to the letters, words or strings being input.

Figure 11:
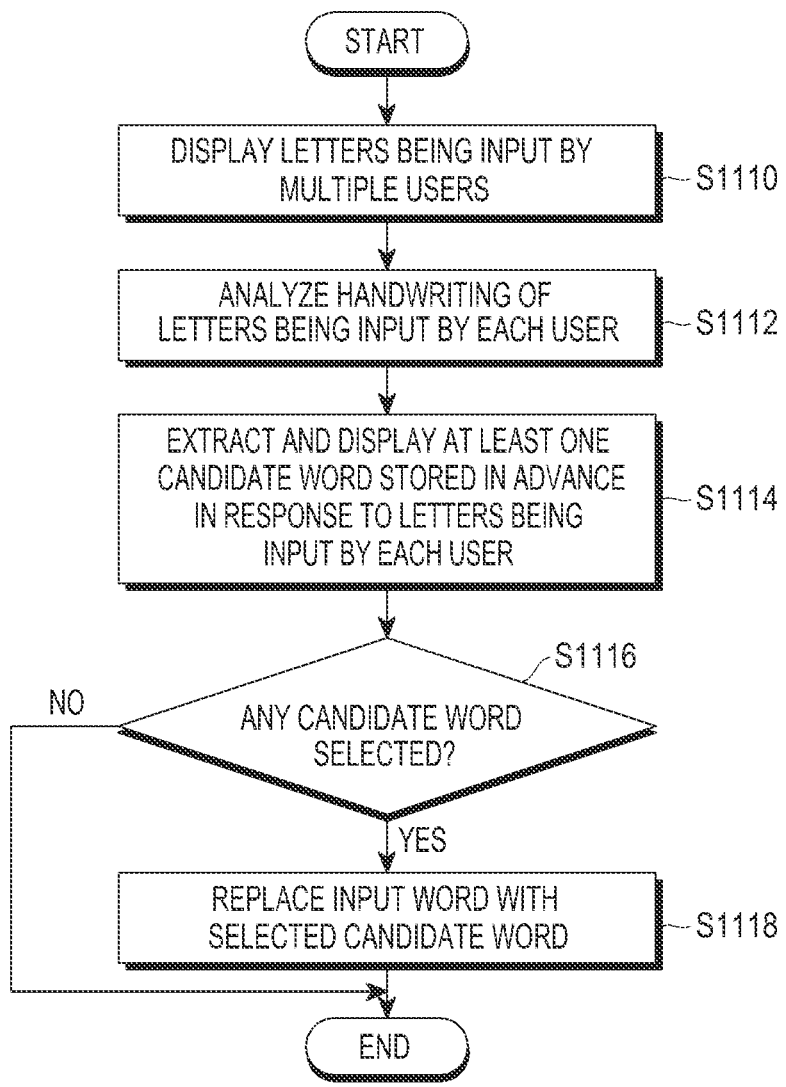
FIG. 11 is a flowchart illustrating a handwriting input method by multiple users according to an embodiment of the present disclosure.

FIG. 11 is a flowchart illustrating a handwriting input method by multiple users according to an embodiment of the present disclosure.

A handwriting input method by multiple users according to an embodiment of the present disclosure will be described in detail below with reference to FIG. 11.

If multiple users desire to create their own handwriting content, the screen 120 may display handwriting letters being input by each of the multiple users at operation S1110. The string being input by each user may be stored in the storage unit 170 in units of at least one of letters, words and sentences. In addition, at least one of letters, words and sentences being input by each user may be stored in the storage unit 170. The letter may include at least one of one syllable for Korean and one character for English. It will be apparent to those of ordinary skill in the art that various embodiments of the present disclosure may be applied not only to Korean and English, but also to a variety of other languages used in different countries, such as Japanese, Chinese, Russian and/or the like.

At operation S1112, the controller 110 may analyze the handwriting (or the style of penmanship) of the handwriting letters being input by each user. The controller 110 may determine each of multiple users by analyzing the handwritings of the handwriting letters being input by the multiple users. Commonly, people have their own unique handwritings, so the controller 110 may analyze these handwritings to determine which letters, strings, words and the like have been input by the user who is now inputting the letters.

The users may be determined based not only on the handwriting analysis, but also on at least one of iris recognition or face recognition by a camera, fingerprint recognition by a fingerprint sensor included in a pen, information about a pen ID assigned to each user, an ID of a user that has presently logged in the system, and a user ID transmitted by a device (e.g., a smart phone or a wearable device) by which the user inputs the handwriting.

At operation S1114, the controller 110 may extract and display at least one candidate word stored in advance in response to the handwriting letters being input by each user. The at least one candidate word may be a word including the input letters. For example, if the user desiring to input or enter a keyword (e.g., '학교 (school)') inputs the first syllable (e.g., '학'), the controller 110 may extract at least one candidate word using the input first syllable. The extracted at least one candidate word may include at least one word whose first syllable is the same as the input first syllable (e.g., '학'), such as '학생 (student)', '학교 (school)', '학부모 (parents)' and '학문 (study)', and may also include at least one word (e.g., '학교 (school)'). Each word may be singular in number, or may be plural in number due to the difference between the user's handwritings. The controller 110 may extract at least one candidate word corresponding to the handwriting letters being input by each user by analyzing the handwriting of each user. The controller 110 may extract multiple words (e.g., '학교 (school)') for each user, and the extracted multiple words (e.g., '학교 (school)') may be different from each other in terms of the handwritings. Similarly, if the user desiring to input a word (e.g., 'school') inputs the first character (e.g., 's'), the controller 110 may extract at least one candidate word using the input first character (e.g., 's'). The extracted at least one candidate word may include at least one word whose first character is the same as the input first character (e.g., 's'), such as 'student', 'school', 'study' and 'sister', and may also include at least one word (e.g., 'school'). Each word may be singular in number, or may be plural in number due to the difference between the user's handwritings. The controller 110 may extract multiple words (e.g., 'school'), and the extracted multiple words (e.g., 'school') may be different from each other in terms of the handwritings.

The at least one candidate word may be stored in the storage unit 170 after a priority of the at least one candidate word is determined using at least one of storage order, input frequency for the word input by the user, and relationship between the input word and a word adjacent thereto, for each user. The at least one candidate word may include a word that is the same as, or similar to a word including the input letters. The at least one candidate word may be displayed in a separate pop-up window on the screen 120, for each user. For the pop-up window, a size and/or display position thereof may be variably adjusted depending on at least one of the number of candidate words, the types of candidate words, and the number of words with the same meaning. The at least one candidate word may include a plurality of the same words, and the plurality of the same words may be included in (or may belong to) at least one candidate word, because each time the word is handwritten by the user, its handwriting may be different. Specifically, the same words may be included in the candidate word, because even though each user handwrites the same word, the handwriting or the pixels in the area at which the word is handwritten may be different. The displayed at least one candidate word may be displayed on the screen 120 by being applied in real time in response to the input letters.

If any candidate word is selected at operation S1116, the controller 110 may proceed to operation S1118 at which the controller 110 may replace the word being input with the selected candidate word, and display the replacement results. At least one candidate word may be displayed depending on its priority based on the first syllable or the first character that is input to the screen 120. If any candidate word is selected by each user while the at least one candidate word is displayed, the selected candidate word may be displayed on the screen 120, replacing the word being input. The arbitrary candidate word may be a word the user desires to input. For example, if the user desiring to input a word (e.g., '학교 (school)') inputs the first syllable (e.g., '학'), the controller 110 may extract at least one candidate word using the input first syllable (e.g., '학'), and display the extracted at least one candidate word on the screen 120 depending on a priority of the extracted at least one candidate word. If another user desiring to input a word (e.g., '택시 (school)') inputs the first syllable (e.g., '택'), the controller 110 may extract at least one candidate word using the input first syllable (e.g., '택'), and display the extracted at least one candidate word on the screen 120 depending on a priority of the extracted at least one candidate word. The controller 110 may perform these operations at the same time or in real time, if multiple users are inputting letters. If any candidate word (e.g., '학교 (school)' or '택시 (school)') is selected by each user while the at least one candidate word is displayed, the controller 110 may replace the input first syllable (e.g., '학' or '택') with a candidate word (e.g., '학교 (school)' or '택시 (school)'), and display the replacement results (e.g., '학교 (school)' or '택시 (school)') on the display 120. According to various embodiments of the present disclosure, through the above process, the user is enabled to create handwriting content. A more detailed example of the handwriting input method according to various embodiments of the present disclosure will be described with reference to FIGS. 12A to 12D.

FIGS. 12A to 12D illustrate an example of a handwriting input method by multiple users according to an embodiment of the present disclosure.

Specifically, FIG. 12A illustrates an example of displaying at least one candidate word corresponding to letters being input by multiple users according to an embodiment of the present disclosure, FIG. 12B illustrates an example of displaying keywords corresponding to letters being input by multiple users in a shaded way according to an embodiment of the present disclosure, FIG. 12C illustrates at least one candidate word corresponding to letters being input by a first user among multiple users according to an embodiment of the present disclosure, and FIG. 12D illustrates at least one candidate word corresponding to letters being input by a second user among multiple users according to an embodiment of the present disclosure.

An example of a handwriting input method by multiple users according to an embodiment of the present disclosure will be described in detail below with reference to FIGS. 12A to 12D.

FIG. 12A illustrates an example of displaying at least one candidate word corresponding to letters being input by multiple users according to an embodiment of the present disclosure, and the screen 120 of the user device 100 may display the handwriting application 1210.

If the multiple users input or enter strings 1230a and 1230b to the handwriting application 1210 using their input units 168a and 168b, respectively, then pop-up windows 1220a and 1220b may be displayed, respectively, which include at least one candidate word corresponding to at least one letter (e.g., 'mo' and 'Hel') that is currently being input or was most recently input, in the input strings 1230a and 1230b. The at least one candidate word displayed in the pop-up windows 1220a and 1220b may be different depending on the input letters. For example, if the handwriting letters being input by the multiple users are 'm' and 'H', at least one candidate word corresponding to the input letters (e.g., 'm' and 'H') may be displayed in the pop-up window 1220a and 1220b depending on the priority. If the at least one letter being input is 'mo' and 'Hel', at least one candidate word corresponding to the input at least one letter (e.g., 'mo' and 'Hel') may be displayed in the pop-up windows 1220a and 1220b depending on the priority. More specifically, if a letter being input is 'm', at least one candidate word may include at least one word whose first character starts with 'm', or may include at least one word whose first character starts with 'm', among the words drawn up in advance by the user.

For example, if the letter being input is 'm', the at least one candidate word may include a variety of words starting with 'm', such as 'mom', 'Monday', 'melon', 'miracle' and 'mystery', and may also include at least one word corresponding to a variety of handwritings, for each of the words. If 'mo' is input to the handwriting application 1210 as the user inputs 'o' after inputting the first character 'm', at least one candidate word may include a variety of words starting with 'mo', such as 'mom', 'Monday', 'morning' and 'mother', and may also include at least one word corresponding to a variety of handwritings, for each of the words. Similarly, if the letter being input is 'H', the at least one candidate word may include a variety of words starting with 'H' (or 'h'), such as Hi, hello, house, hell, honey and helicopter, and may also include at least one word corresponding to a variety of handwritings, for each of the words. The controller 110 may distinguish between uppercase letters and lowercase letters. If 'Hel' is input to the handwriting application 1210 as the user inputs 'e' after inputting the first character 'H', at least one candidate word may include a variety of words starting with 'He' (or 'he'), such as 'Hello', 'hell' and 'helicopter', and may also include at least one word corresponding to a variety of handwritings, for each of the words.

At least one word included in the pop-up windows 1220a and 1220b may be changed, deleted or added in response to the at least one syllable or at least one character being input. The change, deletion, or addition may be applied in real time to the syllable or character being input. According to various embodiments of the present disclosure, the user is enabled to variably adjust the position and size of the displayed pop-up windows 1220a and 1220b. In response to the adjustment of the size of the pop-up windows 1220a and 1220b, the number of candidate words displayed in the pop-up windows 1220a and 1220b may be adjusted depending on respective priorities of the candidate words. The pop-up windows 1220a and 1220b will be described in more detail below with reference to FIGS. 12C and 12D.

Referring to FIG. 12B, if at least one letter that is currently being input with the input units 168a and 168b by the multiple users is 'mo' and 'hel', the pop-up window 1220a including at least one candidate word (e.g., 'mom', 'Monday', 'morning', 'mother', and the like) corresponding to the input letters 'mo' and the pop-up window 1220b including at least one candidate word (e.g., Hello, Hell, Helicopter, and the like) corresponding to the input letters 'Hel' may be displayed, as described in FIG. 12A. For a variety of candidate words included in the pop-up windows 1220a and 1220b, respective priorities thereof may be determined based on at least one of storage order, input frequency, relationship with a word adjacent to the input word or letters (e.g., 'mo' and 'Hel'), and/or the like. In this case, the controller 110 may display the remaining syllables or characters 1240a (e.g., 'rning') of a word with the highest priority among the candidate words on the screen 120 in a shaded way in response to the at least one letter (e.g., 'mo') being input. Similarly, the controller 110 may display the remaining syllables or characters 1240b (e.g., 'lo') of a word with the highest priority among the candidate words on the screen 120 in a shaded way in response to the at least one letter (e.g., 'Hel') being input.

According to various embodiments of the present disclosure, the controller 110 may display both or at least one of the pop-up windows 1220a and 1220b described in FIG. 12A and the remaining characters 1240a and 1240b described in FIG. 12B on the screen 120. The positions at which the remaining characters 1240a and 1240b (e.g., 'rning' and 'lo') are displayed in a shaded way and the positions at which the pop-up windows 1220a and 1220b are displayed, may or may not overlap on the screen 120.

Referring to FIGS. 12C and 12D, if strings are input separately by multiple users, the pop-up windows 1220a and 1220b may be displayed, respectively, which include at least one candidate word corresponding to at least one letter (e.g., 'mo' and 'hel') that is currently being input or was most recently input, in the input strings. The at least one candidate word displayed in the pop-up windows 1220a and 1220b may be different depending on the input letters. As in the case of the example illustrated in FIG. 12A, if at least one letter being input by the multiple users is 'mo' and 'Hel', the pop-up windows 1220a and 1220b may display at least one candidate word corresponding to the input at least one letter (e.g., 'mo' and 'Hel'). The at least one candidate word may include 'morning' 1221, 'monday' 1224, 'mother' 1225', and the like, all of which start with the input at least one letter (e.g., 'mo'), and Hello 1241, Hell 1244, Helicopter 1245, and the like, all of which start with the input at least one letter (e.g., 'Hel'), for each user. The at least one candidate word may also include at least one word 1222, 1223, 1242 and 1243 corresponding to a variety of handwritings for the words 'morning' and 'Hello' with the highest priority among the at least one candidate word. Although the at least one words 1221, 1222 and 1223 and the at least one words 1241, 1242 and 1243 are the same words, the respective handwritings thereof may be different from each other because the words are handwritten by the user. The at least one words 1221, 1222 and 1223 and the at least one words 1241, 1242 and 1243 may be listed in order of good handwriting or recently input word. The at least one word included in the pop-up windows 1220a and 1220b may be a word stored in advance in the storage unit 170, or a word received over the Internet. According to various embodiments of the present disclosure, the plurality of same words may be displayed so as to allow the user to select a preferred one of the plurality of displayed same words.

FIG. 713 is a flowchart illustrating a handwriting input method by multiple users according to another embodiment of the present disclosure.

Figure 13:
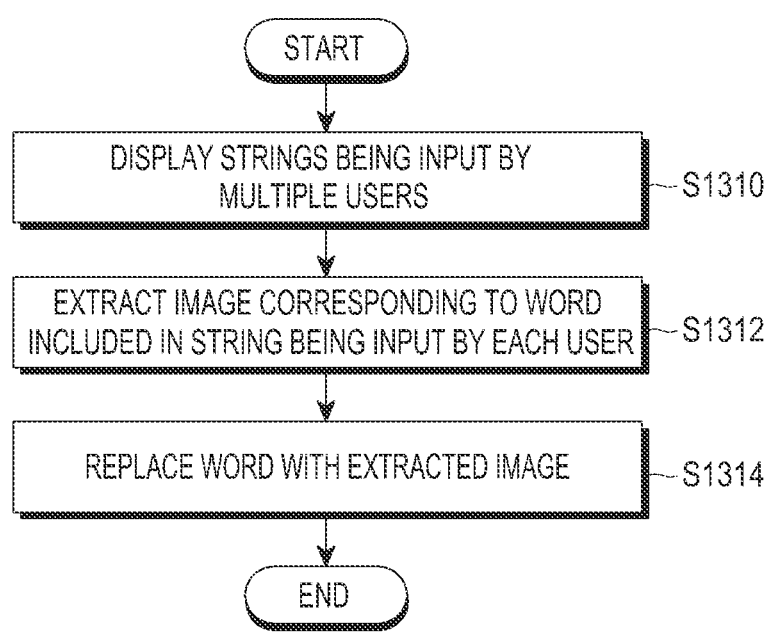
FIG. 13 is a flowchart illustrating a handwriting input method by multiple users according to another embodiment of the present disclosure.

A handwriting input method by multiple users according to another embodiment of the present disclosure will be described in detail below with reference to FIG. 13.

If each of multiple users desires to create or draw up handwriting content, the screen 120 may display a string being input by each of the multiple users at operation S1310. The screen 120, under control of the controller 110, may display a string including letters, words or at least one word being input by each of the multiple users.

At operation S1312, the controller 110 may extract an image corresponding to at least one word included in the string being input by each user. The controller 110 may extract at least one image corresponding to a word included in the string being input by each user. The controller 110 may convert a word included in the string being input by each user into a code, and extract an image that is matched to the code in advance. The controller 110 may analyze a word included in the string being input by each user, and extract an image corresponding to the input word based on the analysis results. For example, if a first user inputs a word '뽀비 (Ppobi)' and a second user inputs a word '택시 (taxi)', the controller 110 may extract at least one image corresponding to each of the input words '뽀비 (Ppobi)' and '택시 (taxi)' from the storage unit 170. The image may be an image that is stored in advance in the storage unit 170, or an image that is received through a communication scheme such as the Internet. The controller 110 may analyze a word included in the string being input by each of the multiple users. In the case in which the analyzed word corresponds to an email address, if the email address is selected, properties or attributes of the analyzed word may be changed so that an email application may be executed. In the case in which the analyzed word corresponds to a phone number, if the phone number is selected, the controller 110 may change properties of the analyzed word so that a phone call may be executed. According to various embodiments of the present disclosure, a handwriting input method may be implemented by selecting an input word corresponding not only to the email address and phone number, but also to a variety of other functions such as a video function, a messaging function, a photo capture function, and/or the like.

The controller 110 may convert the word being input by each user into a text, and extract at least one image corresponding to the text. Each image may be stored in advance in the storage unit 170 after being matched to its associated word using the text or the code. The at least one image may be stored in the storage unit 170 after a priority thereof is determined using at least one of storage order, selection frequency for the word input by the user, and relationship between the input word and its adjacent word. The at least one image may be displayed in a separate pop-up window on the screen 120. For the pop-up window, a size or a display position thereof may be variably adjusted depending on at least one of the number of images, the types of images, the number of images with the same meaning, and/or the like. As for the at least one image, a plurality of images may be included in (or may belong to) the same word. For example, in the case of dogs, there may be a plurality of images corresponding to a variety of dogs depending on the types of dogs, so the images corresponding to a variety of dogs may be included in the at least one image. The displayed at least one image may be displayed on the screen 120 by being applied in real time in response to the word being input.

At operation S1314, the controller 110 may replace the word with the extracted image and display the replacement results. An image corresponding to the word being input to the screen 120 by each user may be extracted, and the extracted image may be displayed on the screen 120, replacing the word being input. As for the extraction of an image corresponding to the word being input, if the user matches words with associated images in advance, or if there are file names of images, the controller 110 may convert the word being input into a text, and extract an image matching with the text. The controller 110 may extract an image and replace the word being input with the extracted word in real time, in response to the word being input by each of the multiple users. Alternatively, after the content that the user desires to input is fully created, the controller 110 may extract an image corresponding to at least one word included in the content and replace the word with the extracted image. If the input of the word is completed, the controller 110 may replace the input word with the extracted image in response to the input of the word, and display the replacement results. Alternatively, after the string being input is completed, or after the desired handwriting content is fully created or input, the controller 110 may extract at least one image corresponding to at least one word included in the completely input string, replace the word with the extracted image, and display the replacement results. Another example of the handwriting input method according to various embodiments of the present disclosure will be described in more detail with reference to FIGS. 14A and 14B.

Figure 14A:
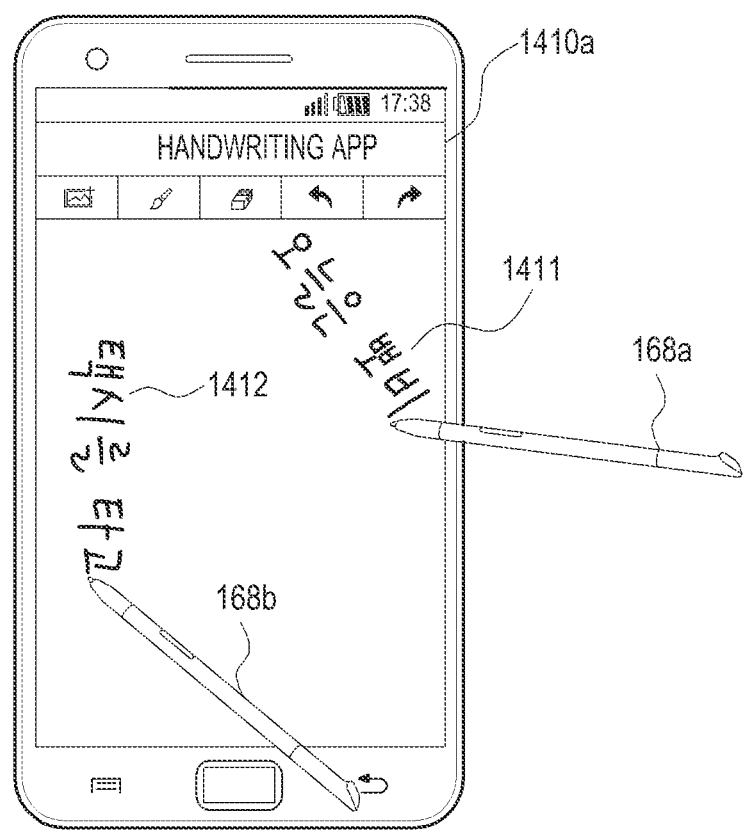
FIG. 14A illustrates an example of displaying strings being input by multiple users according to an embodiment of the present disclosure.
Figure 14B:
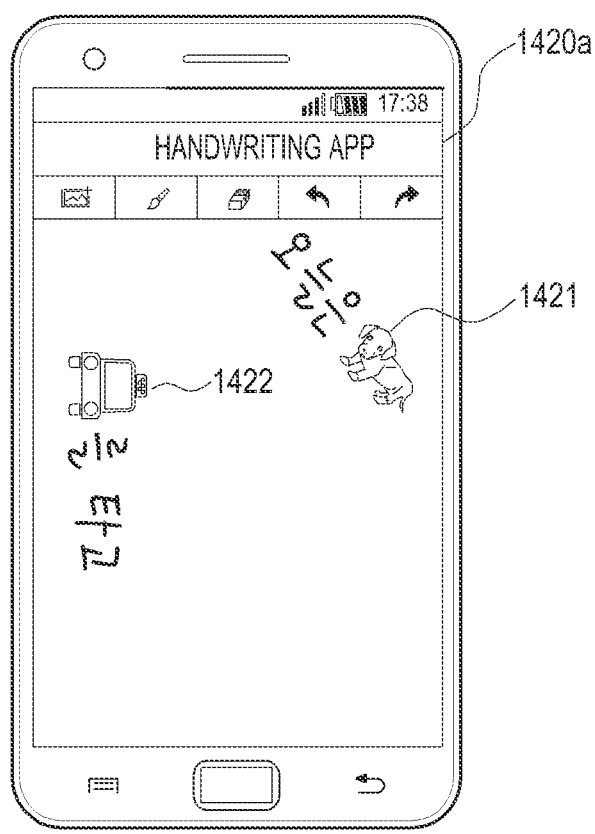
FIG. 14B illustrates an example of replacing words corresponding to strings being input by multiple users with images according to an embodiment of the present disclosure.

FIGS. 14A and 14B illustrate another example of creating handwriting content based on the handwritings input by multiple users according to an embodiment of the present disclosure.

FIG. 14A illustrates an example of displaying strings being input by multiple users according to an embodiment of the present disclosure, and FIG. 14B illustrates an example of replacing words corresponding to strings being input by multiple users with images according to an embodiment of the present disclosure.

An example of creating handwriting content based on the handwritings input by multiple users according to an embodiment of the present disclosure will be described in detail below with reference to FIGS. 14A and 14B.

Referring to FIG. 14A, a screen 1410*a* may display strings that multiple users create or handwrite using input units 168*a* and 168*b*. The strings being input by the multiple users may include words (e.g., '뽀비 (Ppobi)' and '택시 (taxi)') that can be replaced with images. In the case where the strings being input by the multiple users are '오늘 (Today)은 뽀비 (Ppobi)' and '택시 (taxi)를 타고 ', if the input of the word '뽀비 (Ppobi)' 1411 is completed, the controller 110 may convert the input word '뽀비 (Ppobi)' into a text, determine whether an image corresponding to the word '뽀비 (Ppobi)' is present in the storage unit 170, using the text, and extract the image depending on the determination results. Similarly, if the input of the word '택시 (taxi)' 1412 is completed, the controller 110 may convert the input word '택시 (taxi)' into a text, determine whether an image corresponding to the word '택시 (taxi)' is present in the storage unit 170, using the text, and extract the image depending on the determination results. The controller 110 may replace the input word '뽀비 (Ppobi)' 1411 and the input word '택시 (taxi)' 1412 with their associated extracted images as illustrated in FIG. 14B.

Referring to FIG. 14B, if the words (e.g., '뽀비 (Ppobi)' and '택시 (taxi)'), which can be replaced with images in the strings being input by multiple users, are input in FIG. 14A, the controller 110 may determine whether images corresponding to the input words '뽀비 (Ppobi)' and '택시 (taxi)' are present in the storage unit 170, replace the input words '뽀비 (Ppobi)' 1411 and '택시 (taxi)' 1412 with the extracted images 1421 and 1422, and display the replacement results on a screen 1420*a*. If there is no image used for replacing the input words '뽀비 (Ppobi)' and '택시 (taxi)', the controller 110 may extract at least one image used for replacing the input words '뽀비 (Ppobi)' and '택시 (taxi)' from the storage unit 170, or download the images over the Internet, and recommend the extracted or downloaded images to the user.

It will be noted that various embodiments of the present disclosure may be implemented by hardware, software or a combination thereof. The software may be stored in a volatile or non-volatile storage (e.g., erasable/re-writable ROM), a memory (e.g., RAM, memory chip, memory device, or memory IC), or an optically/magnetically recordable non-transitory machine-readable (e.g., computer-readable) storage medium (e.g., Compact Disk (CD), Digital Versatile Disk (DVD), magnetic disk or magnetic tape). The storage unit that can be mounted in the user device may be a mere example of the machine-readable storage medium suitable to store a program or programs including instructions for implementing various embodiments of the present disclosure. Therefore, various embodiments of the present disclosure may include a program including codes for implementing the apparatus or method as defined by the appended claims and their equivalents, and the machine-readable storage medium storing the program. This program may be electronically carried by any media such as communication signals which are transmitted through wired/wireless connections.

According to various embodiments of the present disclosure, the user device may receive and store the program from a program server, to which the user device is connected by wires or wirelessly. The program server may include a memory for storing a program including instructions enabling the user device to perform the method of creating handwriting content, and the necessary information for the handwriting content creation method, a communication unit for performing wired/wireless communication with the user device, and a controller for transmitting the program to the user device at the user's request or automatically.

As is apparent from the foregoing description, according to various embodiments of the present disclosure, the user device and method may display the pre-created recommendable handwriting content and allow the user to select a preferred one, making it possible to quickly re-input the user's desired words or strings, and may quickly perform editing on the pre-created content, thereby providing convenience to the user.

In addition, the user device and method may replace at least one word included in a string being input with at least one of an associated image, photo, and emoticon, providing benefits to the user, and may change properties or attributes of the string being input, making it possible to change the handwriting content according to the user's preference.

Besides, when multiple users enter their own handwriting content to one user device at the same time, the user device and method may analyze the handwriting of each user and recommend at least one candidate word or preferred words corresponding to the analyzed handwriting of each user.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of an electronic device for executing an operation corresponding to a keyword included in handwriting inputs by a user, the method comprising:
   executing a memo application for receiving the handwriting inputs by the user;
   in response to the executing of the memo application, displaying, on a touch screen of the electronic device, a user interface of the memo application for receiving the handwriting inputs by the user;
   receiving the handwriting inputs by the user through the displayed user interface of the memo application;
   displaying the received handwriting inputs in a first color on the user interface;
   identifying at least one keyword from among the displayed handwriting inputs;
   identifying whether an application with respect to the identified at least one keyword is installed in the electronic device;
   when the application with respect to the identified at least one keyword is installed in the electronic device, changing a property of the identified at least one keyword, wherein the at least one keyword, the property of which is changed, is displayed in a second color different from the first color while a remaining portion except the at least one keyword among the received handwriting inputs, the property of which is not changed, is displayed in the first color;
   identifying a touch input on the at least one keyword with the changed property; and
   executing a function of the identified application with respect to the at least one keyword with the changed property based on identifying the touch input,
   wherein the changing of the property of the identified at least one keyword further comprises:
      displaying, on the user interface of the executed memo application, a pop-up window comprising a menu for changing a first color of the user interface of the executed memo application to a second color.

2. The method of claim 1, wherein the executing of the function of the identified application comprises:
   when the at least one keyword identified based on the touch input is a uniform resource locator (URL), executing a browser capable of displaying a webpage based on the URL; and
   displaying the webpage via the executed browser.

3. The method of claim 1, wherein the executing of the function of the identified application comprises:
   when the at least one keyword identified based on the touch input is an e-mail address, executing an application capable of sending an e-mail based on the e-mail address.

4. The method of claim 1, wherein the changing of the property comprises setting a path for executing a program or an application corresponding to the identified at least one keyword.

5. The method of claim 1, further comprises:
   underlining the identified at least one keyword.

6. The method of claim 1, wherein the pop-up window further comprises at least one of a pen setting function, an eraser function, an undo function, or a redo function.

7. The method of claim 1, wherein the function further comprises at least one of transfer an e-mail, a file access or execution, an Internet access, or a call.

8. An electronic device for executing an operation corresponding to a keyword included in handwriting inputs by a user, the electronic device comprising:
- a touch screen; and
- at least one processor configured to:
    - execute a memo application for receiving the handwriting inputs by the user,
    - in response to the executing of the memo application display, on the touch screen, a user interface of the memo application for receiving the handwriting inputs by the user,
    - receive the handwriting inputs by the user through the displayed user interface of the memo application,
    - display, on the touch screen, the received handwriting inputs in a first color on the user interface,
    - identify at least one keyword from among the displayed handwriting inputs,
    - identify whether an application with respect to the identified at least one keyword is installed in the electronic device,
    - when the application with respect to the identified at least one keyword is installed in the electronic device, change a property of the identified at least one keyword, wherein the at least one keyword, the property of which is changed, is displayed in a second color different from the first color while a remaining portion except the at least one keyword among the received handwriting inputs, the property of which is not changed, is displayed in the first color,
    - identify a touch input on the at least one keyword with the changed property, and
    - execute a function of the identified application with respect to the at least one keyword with the changed property based on identifying the touch input,
- wherein the at least one processor is further configured to:
    - display, on the user interface of the executed memo application, a pop-up window comprising a menu for changing a first color of the user interface of the executed memo application to a second color.

9. The electronic device of claim 8, wherein the at least one processor is further configured to:
- when the at least one keyword identified based on the touch input is a uniform resource locator (URL), execute a browser capable of displaying a webpage based on the URL, and
- display the webpage via the executed browser.

10. The electronic device of claim 8, wherein the at least one processor is further configured to:
- when the at least one keyword identified based on the touch input is an e-mail address, execute an application capable of sending an e-mail based on the e-mail address.

11. The electronic device of claim 8, wherein the at least one processor is further configured to set a path for executing a program or an application corresponding to the identified at least one keyword.

12. The electronic device of claim 8, wherein the at least one processor is further configured to:
- underline the identified at least one keyword.

13. The electronic device of claim 8, wherein the pop-up window further comprises at least one of a pen setting function, an eraser function, an undo function, or a redo function.

14. The electronic device of claim 8, wherein the function further comprises at least one of transfer an e-mail, a file access or execution, an Internet access, or a call.

* * * * *